(12) United States Patent
Shiu et al.

(10) Patent No.: US 10,547,339 B2
(45) Date of Patent: Jan. 28, 2020

(54) ELECTRONIC DEVICES HAVING MILLIMETER WAVE WIRELESS DATA TRANSFER CAPABILITIES

(71) Applicant: Apple Inc., Cupertino, CA (US)

(72) Inventors: Boon W. Shiu, San Jose, CA (US); Jobin Jacob, Cupertino, CA (US); Jorge L. Rivera Espinoza, San Jose, CA (US); Kiavash Baratzadeh, Campbell, CA (US); Louie J. Sanguinetti, Los Gatos, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 241 days.

(21) Appl. No.: 15/414,287

(22) Filed: Jan. 24, 2017

(65) Prior Publication Data
US 2017/0222301 A1 Aug. 3, 2017

Related U.S. Application Data

(60) Provisional application No. 62/289,092, filed on Jan. 29, 2016.

(51) Int. Cl.
  *H04B 1/3888* (2015.01)
  *H01Q 1/22* (2006.01)
  *H01Q 1/24* (2006.01)

(52) U.S. Cl.
  CPC ......... *H04B 1/3888* (2013.01); *H01Q 1/2291* (2013.01); *H01Q 1/243* (2013.01)

(58) Field of Classification Search
  CPC .... H01Q 1/243; H01Q 21/065; H01Q 1/2291; H01Q 5/30; H01Q 21/22
  See application file for complete search history.

(56) References Cited

U.S. PATENT DOCUMENTS

| | | | | |
|---|---|---|---|---|
| 4,158,193 A | * | 6/1979 | D'Antonio | H04L 1/241 |
| | | | | 714/707 |
| 5,231,407 A | * | 7/1993 | McGirr | H01Q 1/243 |
| | | | | 343/700 MS |

(Continued)

FOREIGN PATENT DOCUMENTS

| CN | 101364663 A | 2/2009 |
|---|---|---|
| CN | 201577087 U | 9/2010 |

(Continued)

OTHER PUBLICATIONS

Lee et al., A V-Band Front-End With 3-D Integrated Cavity Filters/Duplexers and Antenna in LTCC Technologies, IEEE Transactions on Microwave Theory and Techniques, Jul. 2006, vol. 54, No. 7, pp. 2925-2936.

(Continued)

*Primary Examiner* — Dameon E Levi
*Assistant Examiner* — Jennifer F Hu
(74) *Attorney, Agent, or Firm* — Treyz Law Group, P.C.; Michael H. Lyons

(57) ABSTRACT

An electronic device may be provided with wireless circuitry. The wireless circuitry may include one or more antennas and first and second radio-frequency modules. The device may include a conductive housing having dielectric antenna windows. The first module may generate first millimeter wave signals in a first communications band. The antenna may transmit the first signals to external equipment through the dielectric window at a transmit power level. The antenna may receive control signals in the second communications band from the external equipment through the dielectric window. The first and second communications bands may include frequencies greater than 10 GHz. The second module may pass the received control signals to the first module to adjust the transmit power level of the first signals transmitted by the antenna. A duplexer may be (Continued)

interposed between the modules and the antenna for isolating the first and second communications bands.

18 Claims, 10 Drawing Sheets

(56) References Cited

U.S. PATENT DOCUMENTS

| | | | |
|---|---|---|---|
| 8,230,564 B1* | 7/2012 | Reid, Jr. | H01P 1/2053 |
| | | | 174/256 |
| 8,417,296 B2 | 4/2013 | Caballero et al. | |
| 9,473,207 B2 | 10/2016 | McCormack et al. | |
| 9,667,290 B2 | 5/2017 | Ouyang et al. | |
| 2011/0032050 A1* | 2/2011 | Kouki | H01P 1/2135 |
| | | | 333/132 |
| 2011/0158344 A1 | 6/2011 | Kawamura et al. | |
| 2012/0182893 A1* | 7/2012 | Trainin | H04W 52/245 |
| | | | 370/252 |
| 2013/0016633 A1 | 1/2013 | Lum et al. | |
| 2013/0070817 A1 | 3/2013 | McCormack et al. | |
| 2013/0157729 A1 | 6/2013 | Tabe | |
| 2013/0217336 A1* | 8/2013 | McCormack | H04W 8/085 |
| | | | 455/41.2 |
| 2013/0278468 A1* | 10/2013 | Yehezkely | H01Q 1/24 |
| | | | 343/702 |
| 2016/0308626 A1 | 4/2016 | Mow et al. | |
| 2017/0110787 A1 | 4/2017 | Ouyang et al. | |

FOREIGN PATENT DOCUMENTS

| | | |
|---|---|---|
| CN | 104717735 A | 6/2015 |
| CN | 105025160 A | 11/2015 |
| CN | 105049102 A | 11/2015 |
| CN | 105071827 A | 11/2015 |
| WO | 2013058673 A1 | 4/2013 |

OTHER PUBLICATIONS

Wang et al., 60 GHz duplexer design using dual-mode SIW filters with single-sided transmission zeros, Electronics Letters, Oct. 2014, vol. 50, No. 21, pp. 1529-1531.
Athanaspoulos et al., A 60 GHz Planar Diplexer Based on Substrate Integrated Waveguide Technology, Hindawi Publishing Corporation, Active and Passive Electronic Components, 2013, 6 pages.
Noori et al., U.S. Appl. No. 15/138,684, filed Apr. 26, 2016.
Noori et al., U.S. Appl. No. 15/138,689, filed Apr. 26, 2016.
Mow et al., U.S. Appl. No. 15/217,805, filed Jul. 22, 2016.
Noori et al., U.S. Appl. No. 14/966,421, filed Dec. 11, 2015.

* cited by examiner

ELECTRONIC DEVICES HAVING MILLIMETER WAVE WIRELESS DATA TRANSFER CAPABILITIES

CROSS-REFERENCE TO RELATED APPLICATION

This application claims the benefit of provisional patent application No. 62/289,092, filed Jan. 29, 2016, which is hereby incorporated by reference herein in its entirety.

BACKGROUND

This relates generally to electronic devices and, more particularly, to electronic devices with communications circuitry.

Electronic devices often use communications circuitry to transfer data to external devices. Conventional electronic devices include wired data ports such as Universal Serial Bus (USB) ports, Peripheral Component Interconnect Express (PCIe) ports, Thunderbolt ports, or any other desired ports for conveying data with an external device. The data conveyed over the wired data ports often includes large data files such as high definition video and audio data. The wired data ports allow for relatively high rates of data transfer (i.e., data rates of 1 bit per second or greater). The high data rates obtainable using wired data ports allows for large data files to be transferred to the external device in a relatively short amount of time. However, wired data ports can be bulky and occupy excessive space on the electronic device.

It would therefore be desirable to be able to provide electronic devices with improved data transfer capabilities.

SUMMARY

An electronic device may be provided with wireless circuitry. The wireless circuitry may include one or more antennas. The antennas may be used to handle millimeter wave wireless communications at frequencies of greater than or equal to 10 GHz.

The electronic device may include a conductive housing. If desired the device may include a non-conductive housing or a housing formed from a combination of conductive and non-conductive materials. A display having a display cover layer may be formed in the conductive housing. The conductive housing may include a rear planar surface that opposes the display cover layer. The conductive housing may include conductive sidewall structures that extend from the rear planar surface to the display cover layer. Dielectric antenna windows may be formed within openings in the rear surface of the conductive housing. The antennas may be mounted behind the dielectric antenna windows and may convey millimeter wave signals at Extremely High Frequencies (EHF) of greater than 10 GHz through the dielectric antenna windows.

The electronic device may include radio-frequency circuitry such as first and second radio-frequency modules. The first radio-frequency module may generate first millimeter wave signals in a first EHF communications band. The antenna may transmit the first millimeter wave signals to external equipment through a given one of the dielectric antenna windows at a transmit power level. The antenna may receive second millimeter wave signals in a second EHF communications band from the external equipment through the same dielectric antenna window or through an additional dielectric antenna window. The antenna may receive wireless control signals in the second EHF communications band from the external equipment through the dielectric antenna window. The first and second EHF communications bands may cover the same EHF frequencies or may cover different EHF frequencies. One or both of the EHF communications bands may, for example, be a 60 GHz communications band, a 62.5 GHz communications band, a 58.5 GHz communications band, or any other communications band above 10 GHz.

The electronic device may include a duplexer having a first port coupled to the first radio-frequency module, a second port coupled to the second radio-frequency module, and a third port coupled to the antennas. The duplexer may isolate signals on the first port from leaking onto the second port. The duplexer may pass the received second millimeter wave signals and the received wireless control signals to the second radio-frequency module.

The second radio-frequency module may pass the received wireless control signals to the first radio-frequency module to adjust the transmit power level of the first millimeter wave signals transmitted by the antenna. The second radio-frequency module may pass the second millimeter wave signals to control circuitry. The control circuitry may identify a link quality associated with the second millimeter wave signals by generating wireless performance metric data from the second millimeter wave signals. The control circuitry may identify transmit power level adjustments based on the identified link quality. The control circuitry may convey additional control signals identifying the transmit power level adjustments to the external equipment over the antenna.

In accordance with any of the above arrangements, the control circuitry may inject a pseudo random sequence of test bits onto the antenna for evaluating the wireless link quality associated with the first and/or second millimeter wave signals.

In accordance with any of the above arrangements, the antennas may be arranged in a phased antenna array that transmits the first millimeter wave signals. The control circuitry may control relative phases of the first millimeter wave signals provided to the phased antenna array to perform beam steering operations on the first millimeter wave signals transmitted through the dielectric antenna window.

In accordance with any of the above arrangements, the electronic device may include a single antenna for transmitting signals in the first EHF band through a given dielectric antenna window and for receiving signals in the second EHF band through that dielectric antenna window.

In accordance with any of the above arrangements, the electronic device may include first and second antennas and first and second dielectric antenna windows. The second antenna may receive the second millimeter wave signals and the wireless control signals through the second dielectric antenna window. The first antenna may transmit the first millimeter wave signals through the first dielectric antenna window. In this scenario, the first and second millimeter wave signals may be in the same EHF communications band.

DETAILED DESCRIPTION

Figure 1:
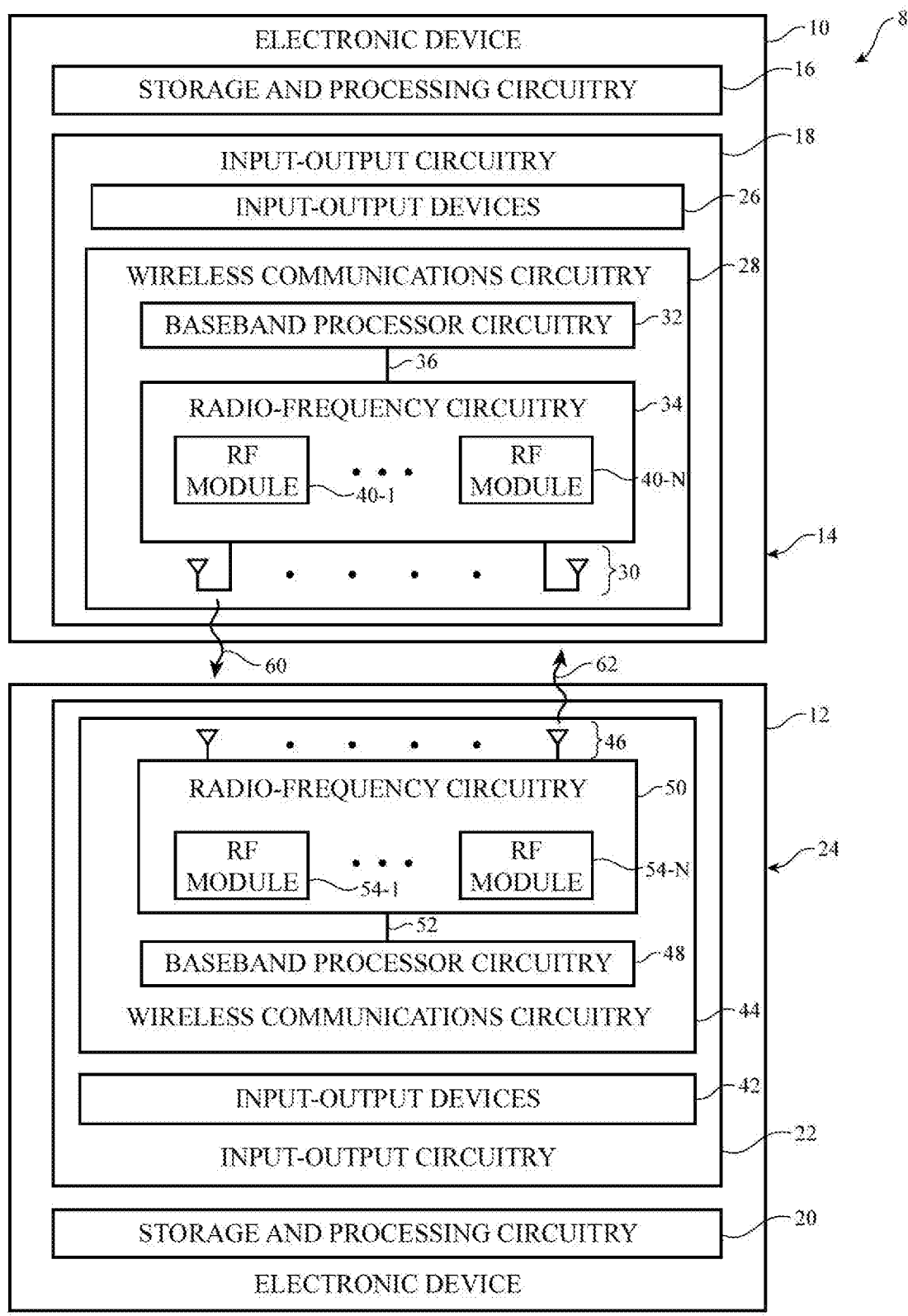
FIG. 1 is a schematic diagram of an illustrative electronic device having wireless communications circuitry for communicating with an external device over millimeter wave communications links in accordance with an embodiment.

Electronic devices such as electronic device 10 of FIG. 1 may contain wireless circuitry. The wireless circuitry may include one or more antennas. The antennas may be used for handling millimeter wave communications. Millimeter wave communications, which are sometimes referred to as extremely high frequency (EHF) communications, involve signals at 60 GHz or other frequencies between about 10 GHz and 400 GHz. If desired, device 10 may also contain wireless communications circuitry for handling satellite navigation system signals, cellular telephone signals, local wireless area network signals, near-field communications, light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, wearable device, or other portable computing device. Other configurations may be used for device 10 if desired. The example of FIG. 1 is merely illustrative.

Electronic device 10 may wirelessly communicate with external electronic devices such as external electronic device 12. While in wireless communication with each other, devices 10 and 12 may sometimes be collectively referred to herein as wireless communications system 8. Electronic device 12 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Electronic device 10 may sometimes be referred to herein as first electronic device 10 or primary electronic device 10, whereas electronic device 12 may sometimes be referred to herein as second electronic device 12, secondary electronic device 12, external electronic device 12, or peripheral electronic device 12. In one suitable arrangement, secondary device 12 may be an accessory or other peripheral device that supports the operations of primary device 10. For example, secondary device 12 may be a docking device, synching device, charging device, or other accessory device for primary device 10. The example of FIG. 1 is merely illustrative and, if desired, other configurations may be used for device 12.

FIG. 1 is a schematic diagram showing illustrative components that may be used in devices 10 and 12. As shown in FIG. 1, first device 10 may include storage and processing circuitry such as storage and processing circuitry 16 and input-output (I/O) circuitry such as input-output circuitry 18. Storage and processing circuitry 16 and input-output circuitry 18 may be enclosed within electronic device housing structures such as housing 14. Housing 14, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 14 may be formed using a unibody configuration in which some or all of housing 14 is machined or molded as a single structure or may be formed using multiple structures (e.g., an internal frame structure, one or more structures that form exterior housing surfaces, etc.).

Storage and processing circuitry 16 in first device 10 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 16 may be used to control the operation of first device 10. This processing circuitry may be based on one or more microprocessors, microcontrollers, digital signal processors, baseband processor integrated circuits, application specific integrated circuits, etc.

Storage and processing circuitry 16 may be used to run software on first device 10, such as internet browsing applications, voice-over-internet-protocol (VOIP) telephone call applications, email applications, media playback applications, operating system functions, data transfer applications, etc. To support interactions with external equipment, storage and processing circuitry 16 may be used in implementing communications protocols. Communications protocols that may be implemented using storage and processing circuitry 30 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, etc.

Input-output circuitry 18 on first device 10 may include input-output devices 26. Input-output devices 26 may be used to allow data to be supplied to first device 10 and to allow data to be provided from first device 10 to external devices. Input-output devices 26 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, a connector port sensor or other sensor that determines whether first device 10 is mounted in a dock, and other sensors and input-output components.

Input-output circuitry 18 may include wireless communications circuitry 28 for communicating wirelessly with external equipment. Wireless communications circuitry 28 may include radio-frequency (RF) transceiver circuitry formed from one or more integrated circuits, power amplifier circuitry, low-noise input amplifiers, passive RF components, one or more antennas such as antennas 30, transmission lines, and other circuitry for handling RF wireless signals. Wireless signals can also be sent using light (e.g., using infrared communications).

Wireless communications circuitry 28 may include baseband processor circuitry 32 for handling transmitted and/or received signals at baseband frequencies. Baseband processor circuitry 32 may include any desired number of discrete baseband processors (e.g., one baseband processor, two baseband processors, more than two baseband processors, etc.). Baseband processor circuitry 32 may provide baseband signals to radio-frequency circuitry 34 over path 36 and/or may receive baseband signals from radio-frequency circuitry 34 over path 36.

Radio-frequency circuitry 34 may up-convert the baseband signals to radio-frequency signals for transmission and may down-convert radio-frequency signals received over antennas 30 to generate baseband signals for baseband processor circuitry 32. Baseband processor circuitry 32 may handle baseband versions of signals that are transmitted and/or received over any desired radio-frequency communications bands.

Radio-frequency circuitry 34 may include one or more radio-frequency (RF) module circuits 40 (e.g., a first RF module 40-1, an Nth RF module 40-N, etc.). Each radio-frequency module 40 may handle radio-frequency signals in a corresponding communications band. Each radio-frequency module 40 may include corresponding transceiver circuitry, filtering circuitry, transmission line structures, amplifier circuitry, data conversion circuitry, matching circuitry, control logic, or any other desired circuitry for handling radio-frequency signals in the corresponding frequency band. Each RF module 40 may be formed on a respective integrated circuit (chip). If desired, two or more of RF modules 40 may be formed on a common substrate or on a common integrated circuit chip. Two or more of modules 40 may be formed on a common substrate or integrated circuit with baseband processor 32, or may be formed on separate substrates or integrated circuits than baseband processor 32, for example. If desired, RF circuitry 34 and baseband circuitry 32 may be formed on separate integrated circuit chips or may both be formed on the same integrated circuit chip. If desired, radio-frequency circuitry 34 may include filtering circuitry, mixing circuitry, amplifier circuitry, transmission line structures, matching circuitry, data conversion circuitry (e.g., analog-to-digital converter circuitry or digital-to-analog converter circuitry), switching circuitry, and/or any other desired circuitry for handling radio-frequency signals that is separate from the circuitry formed on RF modules 40.

Radio-frequency circuitry 34 may handle radio-frequency communications in various radio-frequency communications bands. Radio-frequency circuitry 34 may include wireless local area network transceiver circuitry that handles 2.4 GHz and 5 GHz bands for WiFi® (IEEE 802.11) communications and that handles the 2.4 GHz Bluetooth® communications band. Circuitry 34 may include cellular telephone transceiver circuitry for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 34 may handle voice data and non-voice data.

Radio-frequency circuitry 34 may include millimeter wave transceiver circuitry that supports communications at extremely high frequencies (e.g., millimeter wave frequencies from 10 GHz to 400 GHz or other millimeter wave frequencies). Radio-frequency circuitry 34 may sometimes be referred to herein as millimeter wave circuitry 34. Circuitry 34 may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals for first device 10 are received from a constellation of satellites orbiting the earth.

In satellite navigation system links, cellular telephone links, and other long-range links, wireless signals are typically used to convey data over thousands of feet or miles. In WiFi® and Bluetooth® links and other short-range wireless links, wireless signals are typically used to convey data over tens or hundreds of feet. Extremely high frequency (EHF) wireless transceiver circuitry in circuitry 34 may convey signals over these short distances that travel between transmitter and receiver over a line-of-sight path. To enhance signal reception for millimeter wave communications, phased antenna arrays and beam steering techniques may be used if desired. Antenna diversity schemes may also be used to ensure that the antennas that have become blocked or that are otherwise degraded due to the operating environment of first device 10 can be switched out of use and higher-performing antennas used in their place.

Radio-frequency communications circuitry 34 can include circuitry for other short-range and long-range wireless links if desired. For example, wireless communications circuitry 34 may include circuitry for receiving television and radio signals, paging system transceivers, near field communications (NFC) circuitry, etc.

Antennas 30 in wireless communications circuitry 28 may be formed using any suitable antenna types. For example, antennas 30 may include antennas with resonating elements that are formed from loop antenna structures, patch antenna structures, inverted-F antenna structures, slot antenna structures, planar inverted-F antenna structures, helical antenna structures, hybrids of these designs, etc. If desired, one or more of antennas 30 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 30 can be configured to receive both satellite navigation system signals and signals for other communications bands (e.g., wireless local area network signals and/or cellular telephone signals). Antennas 30 can include one or more antennas or phased antenna arrays that handle millimeter wave communications if desired.

Transmission line paths may be used to route antenna signals within first device 10. For example, transmission line paths may be used to couple antenna structures 30 to radio-frequency circuitry 34. Transmission lines in first device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, amplifier circuitry, impedance matching circuitry, and other circuitry may be interposed within the transmission lines, if desired.

Similarly, second device 12 may include storage and processing circuitry 20 and input-output circuitry 22. Storage and processing circuitry 20 and input-output circuitry 22 may be enclosed within electronic device housing structures such as housing 24. Housing 24 may be formed of plastic, glass, ceramics, fiber composites, metal (e.g., stainless steel, aluminum, etc.), other suitable materials, or a combination of any two or more of these materials. Housing 24 may be formed using a unibody configuration in which some or all of housing 24 is machined or molded as a single structure or may be formed using multiple structures (e.g., an internal frame structure, one or more structures that form exterior housing surfaces, etc.).

Input-output circuitry 22 on second device 12 may include input-output devices 42. Input-output devices 42 may be used to allow data to be supplied to second device 12 and to allow data to be provided from second device 12 to other devices. Input-output devices 42 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, a connector port sensor or other sensor that determines whether device 12 is mounted in a dock, and other sensors and input-output components.

Input-output circuitry 22 may include wireless communications circuitry 44. Wireless communications circuitry 44 may include radio-frequency (RF) transceiver circuitry formed from one or more integrated circuits, power amplifier circuitry, low-noise input amplifiers, passive RF components, one or more antennas such as antennas 46, transmission lines, and other circuitry for handling RF wireless signals. Wireless signals can also be sent using light (e.g., using infrared communications).

Wireless communications circuitry 44 may include baseband processor circuitry 48 for handling transmitted and/or received signals at baseband frequencies. Baseband processor circuitry 48 may provide baseband signals to radio-frequency circuitry 50 over path 52 and/or may receive baseband signals from radio-frequency circuitry 50 over path 52. Radio-frequency circuitry 50 may include radio-frequency modules 54 (e.g., a first module 54-1, an Nth module 54-N, etc.). Each radio-frequency module 54 may handle radio-frequency signals in a corresponding communications band. Each radio-frequency module 54 may include corresponding transceiver circuitry, filtering circuitry, transmission line structures, amplifier circuitry, data conversion circuitry, matching circuitry, control logic, or any other desired circuitry for handling radio-frequency signals in a corresponding frequency band. Each module 54 may be formed on a respective integrated circuit (chip). If desired, two or more of modules 54 may be formed on a common substrate or on a common integrated circuit chip. Two or more of modules 54 may be formed on a common substrate or integrated circuit with baseband processor 48 or may be formed on separate substrates or integrated circuits than baseband processor 48, for example.

If desired, radio-frequency circuitry 50 may include filtering circuitry, mixing circuitry, amplifier circuitry, transmission line structures, matching circuitry, data conversion circuitry (e.g., analog-to-digital converter circuitry or digital-to-analog converter circuitry), switching circuitry, and/or any other desired circuitry for handling radio-frequency signals that is separate from the circuitry formed on modules 54.

Radio-frequency circuitry 50 may handle radio-frequency communications in various radio-frequency communications bands. Radio-frequency circuitry 50 may include wireless local area network transceiver circuitry that handles 2.4 GHz and 5 GHz bands for WiFi® (IEEE 802.11) communications and that handles the 2.4 GHz Bluetooth® communications band. Circuitry 50 may include cellular telephone transceiver circuitry for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 50 may handle voice data and non-voice data.

Radio-frequency circuitry 50 may include millimeter wave transceiver circuitry that supports communications at extremely high frequencies (e.g., millimeter wave frequencies from 10 GHz to 400 GHz or other millimeter wave frequencies). Circuitry 50 may include satellite navigation system circuitry such as Global Positioning System (GPS)

receiver circuitry for receiving GPS signals at 1575 MHz or for handling other satellite positioning data (e.g., GLONASS signals at 1609 MHz). Satellite navigation system signals for device 12 are received from a constellation of satellites orbiting the earth.

Radio-frequency communications circuitry 50 can include circuitry for other short-range and long-range wireless links if desired. For example, wireless communications circuitry 50 may include circuitry for receiving television and radio signals, paging system transceivers, near field communications (NFC) circuitry, etc.

Antennas 46 in wireless communications circuitry 44 may be formed using any suitable antenna types. For example, antennas 46 may include antennas with resonating elements that are formed from loop antenna structures, patch antenna structures, inverted-F antenna structures, slot antenna structures, planar inverted-F antenna structures, helical antenna structures, hybrids of these designs, etc. If desired, one or more of antennas 46 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 46 can be configured to receive both satellite navigation system signals and signals for other communications bands (e.g., wireless local area network signals and/or cellular telephone signals). Antennas 46 can include one or more antennas or phased antenna arrays for handling millimeter wave communications if desired.

Transmission line paths may be used to route antenna signals within device 12. For example, transmission line paths may be used to couple antenna structures 46 to radio-frequency circuitry 50. Transmission lines in device 12 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission lines, if desired.

Storage and processing circuitry 16 on first device 10 and storage and processing circuitry 20 on second device 12 may be used in implementing data transfer protocols (sometimes referred to herein as data bus protocols). The data transfer protocols may be used to perform high data rate data transfer operations (e.g., data transfer operations at speeds of 100 Mega bits per second (Mbps) or more, at 500 Mbps or more, 1 bit per second or more, etc.). Data transfer protocols that may be implemented by processing circuitry 16 and 20 may include Universal Serial Bus (USB) protocols, universal asynchronous receiver/transmitter (UART) protocols, Peripheral Component Interconnect (PCI) protocols, Peripheral Component Interconnect Express (PCIe) protocols, Accelerated Graphics Port (AGP) protocols, or any other desired data transfer protocols capable of data speeds (i.e., data rates) of greater than or equal to approximately 100 Mbps. In general, the data transfer protocols may require at least two concurrent data paths to be maintained to support data transfer operations (e.g., a first path for transmitting data from a first device to a second device and a second path for concurrently transmitting data from the second device to the first device).

Processing circuitry 16 on first device 10 may format data for transmission using a selected data transfer protocol. In some scenarios, input-output devices 26 include wired data port structures such as USB ports that support high data rate transfer protocols. In these scenarios, data may be transmitted to an external device such as second device 12 over the wired data port and corresponding cabling structures. The wired data port and cabling structures may support data transmission at the high data rates associated with the data transfer protocol. However, cables and wired data ports required for implementing the data transfer protocol can be bulky and occupy excessive space within the device. If desired, space within the devices can be conserved by using wireless communications circuitry 28 to wirelessly transmitting data to external device 12.

In general, the data transmission bandwidth and the data rate of wireless communications circuitry 28 (e.g., the number of data bits per second that can be transmitted by circuitry 28) are directly proportional to the frequency that is used to convey the data. For example, data transmitted in higher frequency bands may be conveyed at higher data rates than data conveyed at lower frequencies. While radio-frequency circuitry 34 may convey data at relatively low frequencies such as cellular telephone frequencies or wireless local area network frequencies, these frequencies impose an upper limit on the data rates that can be obtained when transmitting wireless data. For example, transferring data at these frequencies may limit data rates to less than 500 Mbps. Limiting the data rate in this manner can result in relatively long wait times for large data files such as high-definition video or other large sets of data to be transferred to an external device.

If desired, millimeter wave RF modules 40 in first device 10 may be used to transmit data at high data rates (e.g., rates of 500 Mbps or higher, 1 bit per second or higher, 5 Giga bits per second (Gbps), 5 Giga bytes per second (GBps), etc.) to external equipment. Data transfer operations using millimeter wave circuitry on device 10 can obtain significantly higher data rates than when lower frequencies such as wireless local area network or cellular telephone frequencies are used (e.g., because millimeter wave communications are performed at Extremely High Frequencies (EHF) of greater than 10 GHz, which is significantly greater than wireless local area network frequencies or cellular telephone frequencies). As such, device 10 may use EHF signals to transfer relatively large data files in a shorter or even unnoticeable amount of time relative to scenarios where lower frequencies are used.

In order to implement a data transfer protocol capable of handling data rates of 1 bit per second or higher, at least two EHF wireless paths may be established and concurrently maintained between first device 10 and second device 12. As shown in FIG. 1, first and second devices 10 and 12 may establish a first wireless path 60 and a second wireless path 62 between the devices. First and second wireless paths 60 and 62 may be established using RF modules 40 on first device 10 and RF modules 54 on second device 12 that are capable of handling millimeter wave communications. First and second wireless paths 60 and 62 may sometimes be referred to herein as wireless links. First and second wireless links 60 and 62 may collectively form a wireless data transfer link between devices 10 and 12 that implements a corresponding data transfer protocol and that handles data transfer at rates of greater than or equal to 1 bit per second or rates at greater than or equal to 500 Mbps, for example.

In order to handle such high data rates, wireless links 60 and 62 may be at EHF frequencies of greater than or equal to 10 GHz. For example, EHF links 60 and 62 may established in frequency bands at 58.5 GHz, 60 GHz, 62.5 GHz, a frequency band between 58.5 and 60 GHz, a frequency band between 60 GHz and 62.5 GHz, a frequency band great than 62.5 GHz, a frequency band between 10 GHz and 58.5 GHz, etc. EHF links 60 and 62 may both convey signals over the same frequency band or may convey signals in different frequency bands. In implementing the corresponding data transfer protocol, wireless link 60 may be used to convey data in a direction from first device 10 to second device 12 whereas link 62 is used to convey data in a direction from second device 12 to first device 10. If desired, more than two wireless links may be concurrently established between the devices. Data may be conveyed between first device 10 and second device 12 at relatively high data rates of 500 Mbps or more (e.g., 1 Gbps, 1 GBps, 5 Gbps, 10 Gbps, more than 10 Gbps, 5 GBps, more than 5 GBps, etc.). In some scenarios, data rates may be at rates of greater than or equal to 1 bit per second (e.g., between 1 bit per second and 100 Mbps, between 100 Mbps and 1 Gbps, etc.).

Different respective RF modules 40 in device 10 may be used to handle each of links 60 and 62. For example, first RF module 40-1 may handle wireless transmission over link 60 whereas Nth RF module 40-N handles wireless reception over link 62. Similarly, different respective RF modules 54 in device 12 may be used to handle each of links 60 and 62. For example, RF module 54-1 may handle wireless reception over link 60 whereas RF module 54-N handles wireless transmission over link 62. In this way, EHF signals transmitted by RF module 40-1 may be received by RF module 54-1 and EHF signals transmitted by module 54-N may be received by RF module 40-N.

If desired, the same frequency may be used for both EHF links 60 and 62. In this scenario, RF module 40-1 may transmit signals for link 60 over a first antenna 30 and RF module 40-N may receive signals from link 62 over a second antenna 30. Similarly, RF module 54-1 may receive signals for link 60 over a first antenna 54-1 and RF module 54-N may transmit signals for link 62 over a second antenna 46. If desired, different frequencies may be used for links 60 and 62. In this scenario, modules 40-1 and 40-N may transmit and receive signals using the same antenna 30 (e.g., signals for links 60 and 62 may be handled using the same antenna 30). Similarly, RF module 54-1 and RF module 54-N may transmit and receive signals using the same antenna 46.

Figure 2:
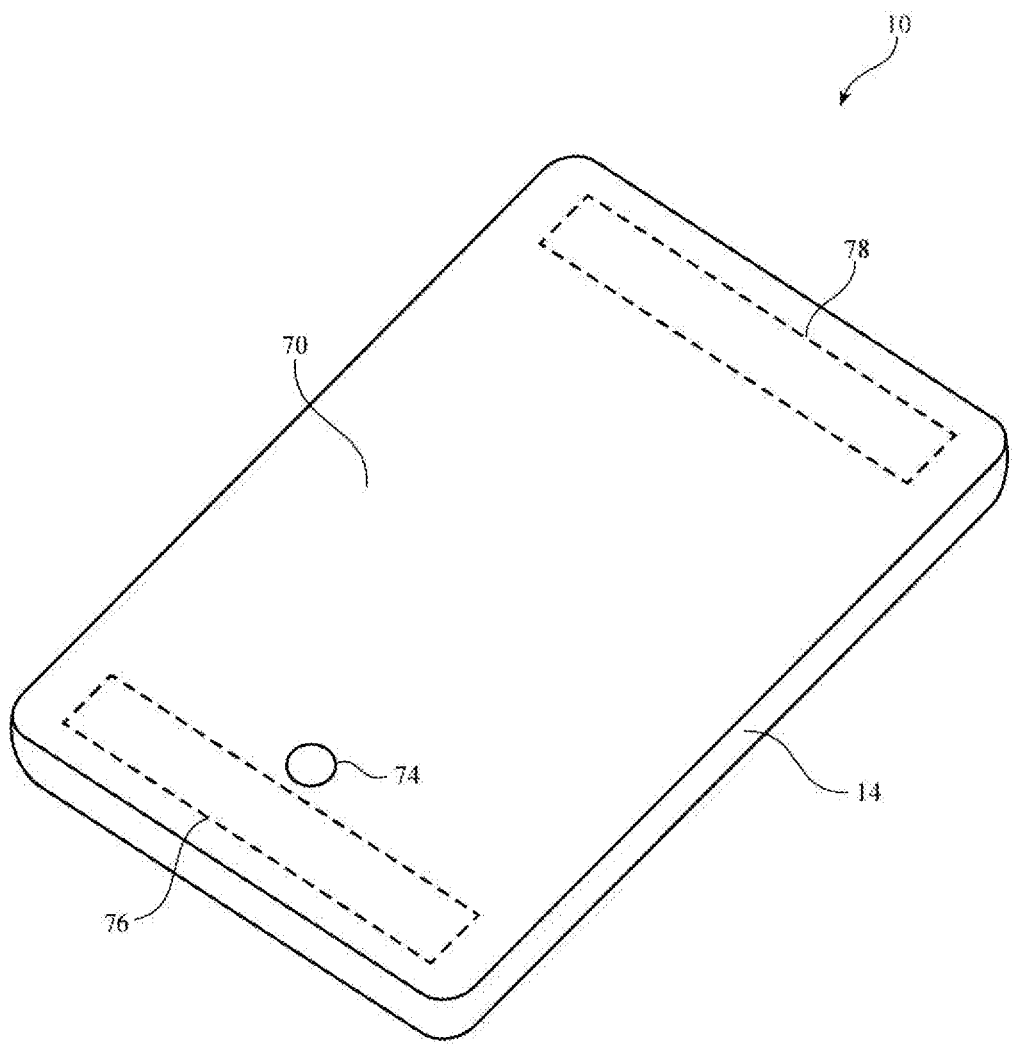
FIG. 2 is a perspective view of an electronic device having antennas for performing millimeter wave communications in accordance with an embodiment.

FIG. 2 is an illustrative diagram showing how antennas 30 may be formed within first device 10. In the example of FIG. 2, device 10 includes a display such as display 70. Display 70 may be mounted in housing 14. Display 70 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 70 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 70 may be protected using a display cover layer such as a layer of transparent glass, clear plastic, sapphire, or other transparent dielectric. Openings may be formed in the display cover layer. For example, an opening may be formed in the display cover layer to accommodate a button such as button 74. An opening may also be formed in the display cover layer to accommodate ports such as a speaker port. Openings may be formed in housing 14 to form communications ports (e.g., an audio jack port, a digital data port, etc.). In scenarios where antennas 30 are used to convey data at high data rates over EHF bands to external devices, digital data ports such as USB ports and the corresponding openings in housing 14 may be omitted (e.g., thereby enhancing the form factor of device 10 and/or allowing for additional space within device 10 to be used in forming other components).

Antennas 30 may be mounted in housing 14. For example, housing 14 may have four peripheral edges as shown in FIG. 2 and one or more antennas may be located along one or more of these edges. As shown in the illustrative configuration of FIG. 2, antennas 30 may, if desired, be mounted in regions 76 and 78 along opposing peripheral edges of housing 12 (as an example). If desired, metal portions of housing 14 may form a portion of the antennas in device 10. For example, external conductive surfaces of housing 14 may form portions of resonating elements and/or ground planes for antennas 40. In one suitable arrangement, housing 14 includes a conductive rear surface and conductive sidewalls that extend from the rear surface to a dielectric cover of display 70. Antennas 30 may also be mounted in other portions of device 10, if desired. The configuration of FIG. 2 is merely illustrative.

If desired, one or more of antennas 30 in device 10 may be used to convey both EHF data signals and radio-frequency signals at frequencies below EHF frequencies (e.g., wireless local area network signals, cellular telephone signals, NFC signals, satellite navigation signals, etc.). In another suitable arrangement, a first set of antennas 30 may be used to convey signals at EHF frequencies whereas a second set of antennas 30 are used to convey signals at frequencies below EHF frequencies. For example, antennas used to convey signals at frequencies below EHF frequencies may be formed in regions 78 and 76 and may have resonating elements formed from metal portions (e.g., external surfaces) of housing 14. In other words, metal portions of housing 14 that surround a periphery of device 10 may form non-EHF antennas for device 10. In this example, one or more separate antennas may be used to convey EHF signals. The antennas that convey EHF signals may be mounted adjacent to the rear metal surface of housing 14. The rear metal surface of housing 14 may include one or more dielectric antenna windows. The antennas that convey EHF signals may convey wireless EHF signals through the dielectric antenna windows (e.g., so that the metal housing does not block the signals). This example is merely illustrative. The arrangement shown in FIG. 2 may also be used for implementing second electronic device 12 if desired.

Figure 3:
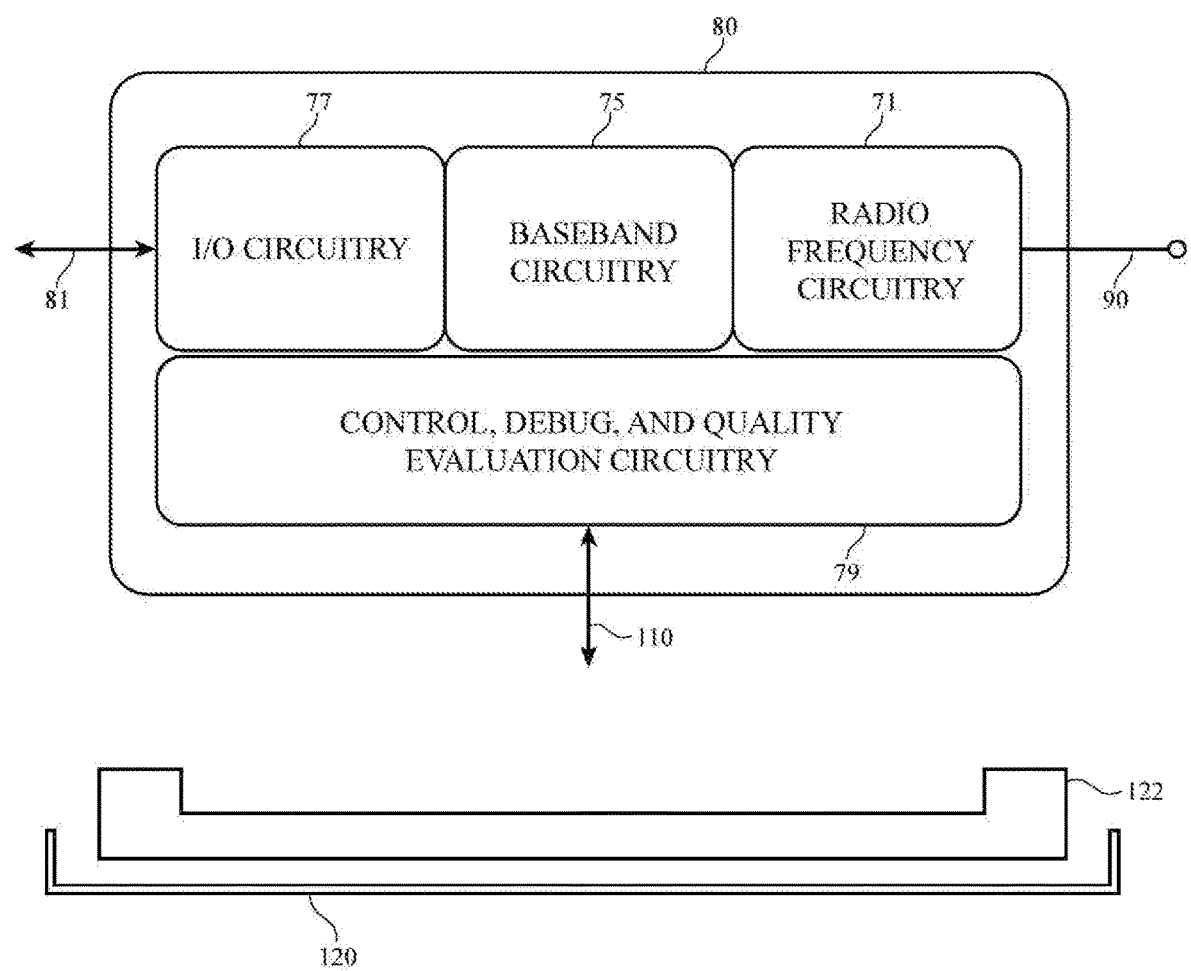
FIG. 3 is a block diagram of an illustrative radio-frequency communications module for performing millimeter wave communications in accordance with an embodiment.

FIG. 3 is an illustrative diagram that may be used for handling EHF signals over links 60 and/or 62. The radio-frequency module of FIG. 3 may, for example, be used to implement one of radio-frequency modules 40 of first device 10 or one of radio-frequency modules 54 of second device 12 of FIG. 1. RF module 80 (e.g., an RF module such as module 40-1 or 40-N of device 10 or module 54-1 or 54-N of device 12) may handle communications in an EHF band. The components of module 80 may be formed on a common substrate or on a common integrated circuit, if desired.

As shown in the example of FIG. 3, baseband circuitry 32 may be formed as a portion of RF module 80 (e.g., baseband circuitry 75 may include some or all of baseband circuitry 32 of FIG. 1). In another suitable arrangement, baseband circuitry 32 may be formed separately from module 80. Module 80 may include input-output (I/O) circuitry 77 coupled to an input of baseband circuitry 75 and radio-frequency circuitry 71 coupled to an output of baseband circuitry 75. I/O circuitry 77 may serve as an input-output interface with data path 81. I/O circuitry 77 may receive data for transmission (e.g., from processing circuitry 16) over data path 81.

Baseband circuitry 75 may receive the data via I/O circuitry 77 and may perform baseband operations on the received data. Radio-frequency circuitry 71 may perform radio-frequency up-conversion on the data to convert the baseband signals to EHF signals. Radio-frequency circuitry 71 may be coupled to output path 90. Output path 90 may be a transmission line path to antennas 30 or to other antennas in the device. The EHF signals may be conveyed to output path 90. Similarly, EHF signals may be received over path 90. The EHF signals may be down-converted to baseband signals by circuitry 71. Baseband circuitry 75 may perform baseband operations on the received baseband signals and may convey the baseband signals to path 81 over I/O path 77. Radio-frequency circuitry 71 may include any desired filtering circuitry, switching circuitry, matching circuitry, conversion circuitry, mixing circuitry, or amplifying circuitry.

RF module 80 may include control and debug circuitry 79. Circuitry 79 may provide control signals to circuitry 77, 75, and 71 via intra-module control paths (not shown). Circuitry 79 may receive control signals from other circuitry via inter-chip control path 110. Circuitry 79 may provide control signals to other circuitry such as other radio-frequency modules via control path 110. Circuitry 79 may control the operation of module 80, may control the operation of other radio-frequency modules on device 10 and/or device 12, and may perform testing and link quality evaluation operations on EHF links 60 and 62.

Module 80 of FIG. 3 may include amplifier circuitry such as a transmit (power) amplifier and a low noise amplifier (LNA). The amplifier circuitry may be formed in radio-frequency portion 71, may be interposed on transmission line 90, may be formed external to module 80 and interposed on transmission line 90, etc. When conveying data for transmission, the power amplifier circuitry may receive signals for transmission over input path 81. The amplifier may amplify (e.g., provide a greater-than-unity gain) to the received transmit signals and may provide the amplified signals to transmission line 90. Output path 90 may convey the transmit signals to antennas 30 via other filtering circuitry, amplifier circuitry, and/or transmission line structures in radio-frequency circuitry 34 (FIG. 1). The gain provided by the amplifiers may be adjusted using amplifier control signals. The amplifier control signals may include gain adjustment control signals, signals for adjusting amplifier bias, signals for activating a desired number of amplifier gain stages, or any other desired control signals for adjusting the gain provided by the amplifiers. The control signals may be provided by control circuitry 79, by storage and processing circuitry 16 (FIG. 1), or by other power control circuitry on first device 10. The amplifiers may be adjusted using control signals to provide transmit signals on output path 90 at a desired transmit power level. The amplifiers may be adjusted using control signals to increase or decrease the transmit power level of EHF signals at output path 90 in real time.

If desired, radio-frequency circuitry 71 may receive radio-frequency signals from path 90. The received signals may be passed to the input of a low noise amplifier. The low noise amplifier may amplify the received signals and may output the amplified signals to circuitry 75. Control circuitry 79 may sometimes be referred to herein as control logic.

Control circuitry 79 may be configured using control signals received over control path 110 (e.g., control signals received from storage and processing circuitry 16 on the device via path 110). Control circuitry 79 may provide control signals to other radio-frequency modules 40 over path 110 to control the operation of those radio-frequency modules. Paths 81, 90, and/or 110 may include radio-frequency transmission line structures and/or conductive contacts such as conductive pins, contact pads, or vias, if desired. Control path 110 may convey data organized according to an Inter-Chip Communication (ICC) protocol, for example.

If desired, control circuitry 79 may include debugging circuitry. The debugging circuitry may be used to perform debugging or test operations on device 10, device 12, and/or EHF wireless links 60 and 62. For example, the debugging circuitry may generate a sequence of test bits such as a pseudo-random bit sequence (e.g., a series of pseudo-random data bits). Circuitry 79 may inject the test bits onto path 90 via radio-frequency circuitry 71. The test bits may be transmitted over path 90 and received at external device 12 (in scenarios where module 80 is formed on first device 10). External device 12 may process the received test bits to test the quality of wireless links 60 and 62 if desired.

If care is not taken, data transmitted over EHF wireless link 60 may interfere with data transmitted over EHF wireless link 62 and/or data over link 62 may interfere with data transmitted over link 60. In scenarios where links 60 and 62 are at the same EHF frequency band (e.g., when different respective antennas 30 are used to convey signals for each link), radio-frequency shielding structures such as shield 120 may be formed around one or more sides of module 80 to mitigate interference between the data links. Shield 120 may include a conductive structure such as a metal sheet or other structure for blocking radio-frequency signals. Shield 120 may be interposed between RF modules 40-1 and 40-N. If desired, shield 120 may extend around one, two, or three sides of module 80. If desired, radio-frequency absorber structures such as absorber 122 may be formed around one or more sides of module 80. Absorber 122 may include dielectrics or other materials for absorbing radio-frequency signals. Absorber 122 may be interposed between RF modules 40-1 and 40-N. If desired, absorber 122 may extend around, one, two, three, or four sides of module 80. Module 80 may be provided with absorber 122, shield 120, shield 120 and absorber 122, or shield 120 and absorber 122 may be omitted. Shield 120 and absorber 122 may serve to reduce interference between modules 40-1 and 40-N. This may allow modules 40-1 and 40-N to be placed closer together on device 10 than in scenarios where no shields or absorbers are used.

Radio-frequency circuitry 34 on first device 10 and radio-frequency circuitry 50 on second device 12 may transmit EHF signals at desired transmit power levels. The transmit power levels may be determined by the gain provided by amplifiers within and/or external to modules 80 on each device. In general, higher transmit power levels may result in a higher wireless link quality than lower transmit power levels. However, higher transmit power levels may use more power and deplete batteries on the devices faster than when lower transmit power levels are used.

If desired, device 10 and/or device 12 may actively perform transmit power level adjustments for links 60 and 62 in real time. By adjusting the transmit powers in real time (e.g., while links 60 and 62 are already established), system 8 may ensure that the EHF wireless links have sufficient link quality while optimizing power consumption within the devices.

Figure 4:
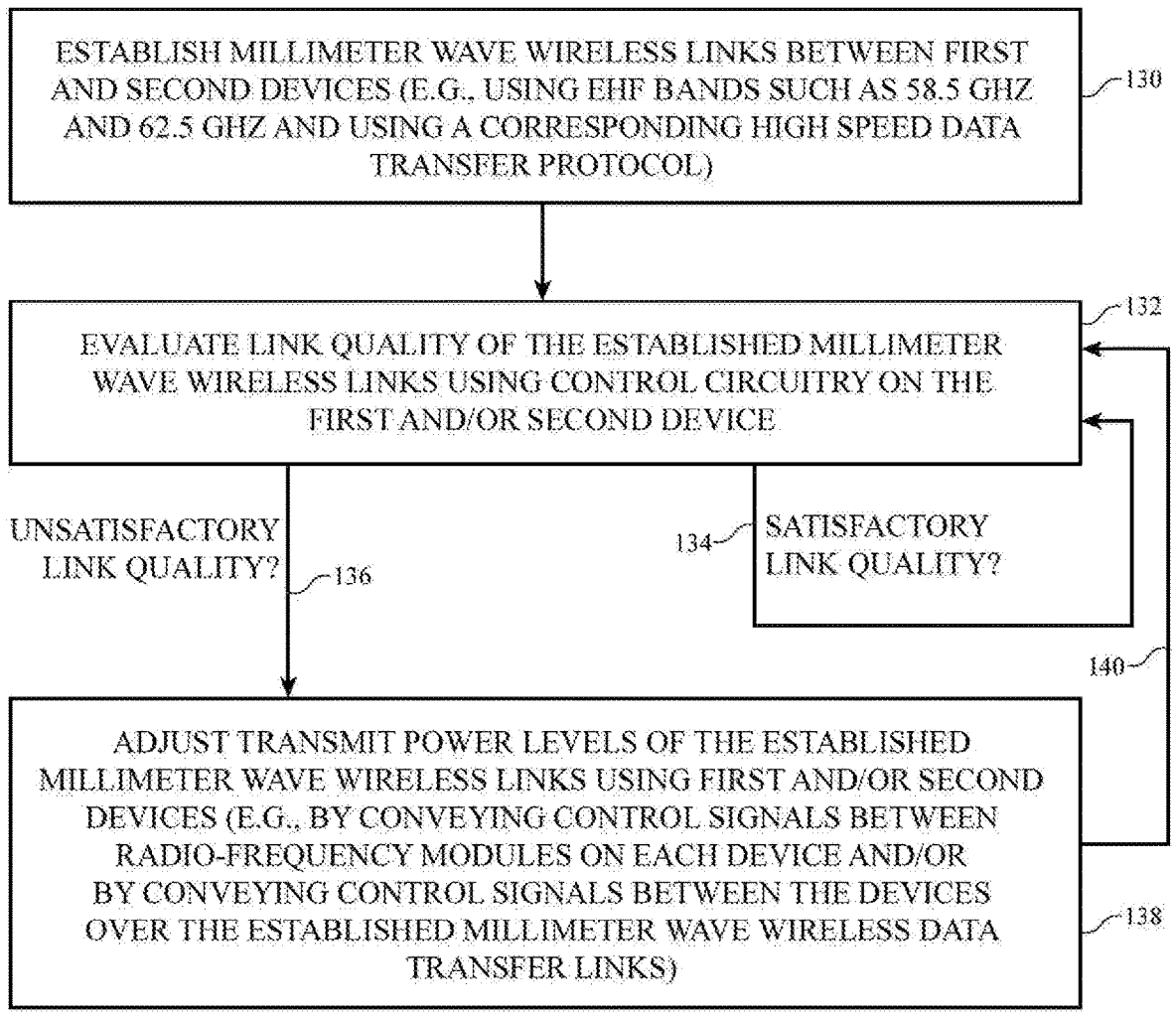
FIG. 4 is a flow chart of illustrative steps that may be performed by first and second electronic devices for optimizing transmit power levels of millimeter wave communications links between the first and second electronic devices in accordance with an embodiment.

FIG. 4 is a flow chart of illustrative steps that may be performed by communications system 8 for adjusting the transmit powers of EHF links 60 and 62 in real time.

At step 130, devices 10 and 12 may establish EHF wireless data transfer links 60 and 62 between devices 10 and 12 (FIG. 1). For example, RF module 40-1 on device 10 may establish wireless link 60 with RF module 54-1 on device 12 in an EHF frequency band whereas RF module 40-N on device 10 establishes wireless link 62 with RF module 54-N on device 12 in an EHF frequency band. Once the links have been established, RF module 40-1 may transmit data over link 60 to RF module 54-1 and RF module 54-N may transmit data over link 62 to RF module 40-N. Established links 60 and 62 may collectively implement a high speed data transfer protocol such as PCIe, USB, modified versions of these, or any other desired data transfer protocol. RF module 54-N may transmit data over link 62 at a first predetermined transmit power level and module 40-1 may transmit data over link 60 at a second predetermined transmit power level.

Devices 10 and 12 may establish links 60 and 62 using a wireless handshake procedure if desired. For example, RF module 54-N on second device 12 may generate a predetermined series of data bits such as a device token and may transmit the device token to RF module 40-N on first device 10 (e.g., over an EHF frequency band). Control circuitry (e.g., circuitry 79 of FIG. 3) on RF module 40-N may obtain the received device token and may identify that second device 12 is attempting to establish an EHF wireless link with first device 10. Control circuitry 79 on RF module 40-N may provide control signals to RF module 40-1 over control path 110 on first device 10. The control signals may instruct RF module 40-1 to generate a response message. RF module 40-1 may transmit the response message to RF module 54-1 (e.g., over an EHF frequency band). RF module 54-1 may identify the received response message and may identify that first device 10 is ready for communication. RF module 54-1 may send control signals to RF module 54-N over control path 110 on second device 12 to inform RF module 54-N that a response has been received from first device 10. Once RF module 54-N has identified that the response has been received, links 60 and 62 may be successfully established and data may be conveyed over links 60 and 62 normally (e.g., at a high data rate of greater than 500 Mbps, at a data rate of greater than 1 bit per second, etc.).

At step 132, first device 10 and/or second device 12 may evaluate the quality of established EHF links 60 and 62. For example, RF module 40-N may receive data from RF module 54-N over EHF link 62. Module 40-N may pass the received data to baseband processor circuitry 32 (or baseband circuitry 75 in the example of FIG. 3). Data processing circuitry in baseband 32 and/or in storage and processing circuitry 16 on first device 10 may process the received data to evaluate/analyze the quality of EHF link 62. Similarly, RF module 54-1 may receive data from RF module 40-1 over EHF link 60. Module 54-1 may pass the received data to baseband processor circuitry 48. Data processing circuitry in baseband 48 and/or in storage and processing circuitry 20 on second device 12 may process the received data to evaluate/analyze the quality of EHF link 62.

The quality of EHF link 62 may be evaluated using any desired wireless performance metrics. First device 10 and/or second 12 may gather wireless performance metric data from the received data and may use the performance metric data to characterize the quality of EHF links 60 and 62. Performance metric data gathered by first device 10 and/or second device 12 for evaluating EHF wireless link quality may include, for example, received power, receiver sensitivity, frame error rate, bit error rate, channel quality measurements based on received signal strength indicator (RSSI) information, adjacent channel leakage ratio (ACLR) information (e.g., ACLR information in one or more downlink frequency channels), channel quality measurements based on received signal code power (RSCP) information, channel quality measurements based on reference symbol received power (RSRP) information, channel quality measurements based on signal-to-interference ratio (SINR) and signal-to-noise ratio (SNR) information, metrics measuring interference between links 60 and 62, channel quality measurements based on signal quality data such as Ec/Io or Ec/No data, any desired combination of these performance metrics, and other information that is reflective of the quality of EHF links 60 and 62.

First device 10 and/or second device 12 may process the generated performance metric data to determine whether the quality of EHF links 60 and/or 62 is satisfactory. For example, first device 10 and/or second device 12 may compare the generated performance metric data to corresponding performance metric threshold values or ranges of acceptable values. If the generated performance metric values are within a corresponding range of acceptable values, are below a threshold defining an upper limit of acceptable values, or are above a threshold defining a lower limit of acceptable values, devices 10 and 12 may identify that the EHF links have satisfactory link quality. The range of acceptable values and corresponding threshold values may be determined by an operator of system 8, a wireless carrier, industry standards or regulations, a manufacture of device 10 and/or 12, or by any other desired means. If first and second devices 10 and 12 identify that EHF links 60 and 62 have satisfactory link quality, devices 10 and 12 may continue to transmit data at the same transmit power levels. As shown by path 134, devices 10 and 12 may continue to evaluate the quality of established EHF links 60 and 62 in real time.

If first device 10 and/or second device 12 determine that one or both of EHF links 60 and 62 have unsatisfactory link quality, processing may proceed to step 138 as shown by path 136. At step 138, the transmit power levels of first device 10 and/or second device 12 may be adjusted (e.g., increased or decreased). Transmit power level adjustments may be performed between RF modules on each device (e.g., between modules 40-1 and 40-N on device 10 or between modules 54-1 and 54-N on device 12) by conveying control signals over inter-chip control paths 110. If desired, transmit power level adjustments may be performed by conveying control signals between devices 10 and 12 over EHF links 60 and 62.

For example, RF module 54-1 on second device 12 may determine that EHF link 60 has unsatisfactory link quality (e.g., processing circuitry 20 on second device 12 may determine that performance metric data gathered for data received over link 60 lies outside of a range of acceptable performance metric data values). Module 54-1 and/or storage and processing circuitry 20 may identify that RF module 40-1 needs to adjust the transmit power level of EHF link 60. Module 54-1 may transmit control signals to RF module 54-N over inter-chip control path 110 on second device 12. The control signals may identify the transmit power level change for RF module 40-1. RF module 54-N may transmit the received control signals to RF module 40-N over wireless EHF path 62. RF module 40-N may receive the control signals from RF module 54-N and may convey the control signals to RF module 40-1 over the inter-chip control path 110 on first device 10. RF module 40-1 may adjust the transmit power level provided to signals transmitted over EHF link 60 based on the received control signals.

As another example, RF module 40-N on first device 10 may determine that EHF link 62 has unsatisfactory link quality (e.g., processing circuitry 16 on device 10 may determine that performance metric data gathered for data received over link 62 lies outside of a range of acceptable performance metric data values). Module 40-N and/or storage and processing circuitry 16 may identify that RF module 54-N on second device 12 needs to adjust the transmit power level of EHF link 62. Module 40-N may transmit control signals to RF module 40-1 over the inter-chip control path 110 on first device 10. The control signal may identify the transmit power level change for RF module 54-N. RF module 40-1 may transmit the received control signal to RF module 54-1 over EHF path 60. RF module 54-1 may receive the control signal from RF module 40-1 and may convey the control signal to RF module 54-N over the inter-chip control path 110 on second device 12. RF module 54-N may adjust the transmit power level provided to signals transmitted over EHF link 62 based on the received control signals.

The adjustments to transmit power levels for EHF link 60 and 62 may ensure that links 60 and 62 have a satisfactory link quality. If desired, the adjustments to transmit power levels may ensure that the transmitted signals are provided with a desired amount of jitter. First device 10 and second device 12 may continue to transmit data normally using the adjusted transmit power levels. Processing may subsequently loop back to step 132 as shown by path 140 to continue to evaluate the quality of EHF links 60 and 62 in real time (e.g., to ensure that the transmit power levels are updated if link quality deviates over time). In this way, devices 10 and 12 may perform loop feedback power adjustments (e.g., adjustments to the EHF links based on active feedback obtained from measurements of the EHF links) for EHF links 60 and 62 to ensure that the quality of links 60 and 62 are optimized over time.

Figure 5:
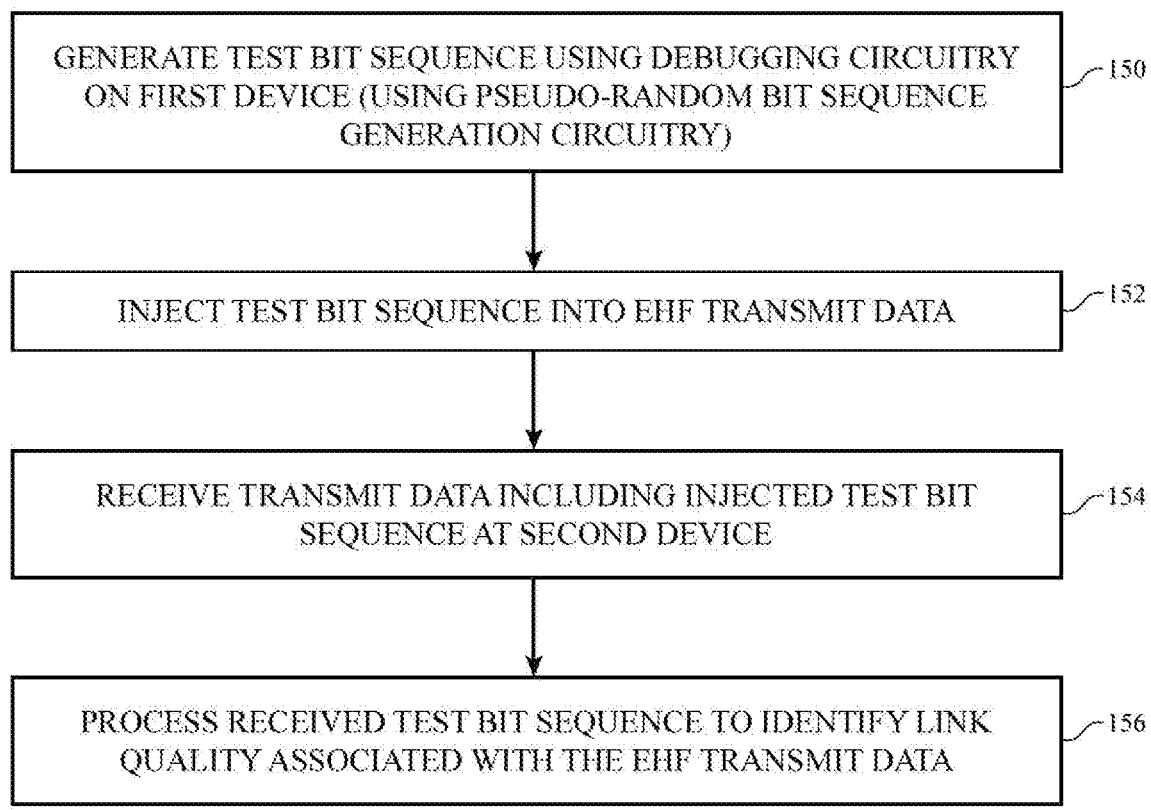
FIG. 5 is a flow chart of illustrative steps that may be performed by a radio-frequency communications module for evaluating the quality of a millimeter wave communications link using an injected test bit pattern in accordance with an embodiment.

If desired, debugging circuitry 79 on RF module 80 may generate test data for evaluating the quality of EHF links 60 and 62. FIG. 5 is a flow chart of illustrative steps that may be performed by first and second devices 10 and 12 for evaluating the quality of EHF links 60 and 62 using generated test data. The steps of FIG. 5 may, for example, be performed while processing step 132 of FIG. 4.

At step 150, one of devices 10 and 12 may generate a test bit sequence using corresponding debugging circuitry 79. For example, debugging circuitry 79 on RF module 40-1 of first device 10 may generate a test bit sequence. The test bit sequence may be a stream of data bits. Debugging circuitry 79 may include pseudo-random number generator circuitry that generates the test bit sequence as a pseudo-random sequence of data bits (e.g., a pseudo-random sequence of binary "1" and "0"). The pseudo-random sequence of data bits may sometimes be referred to herein as a pseudo-random bit sequence (PRBS).

At step 152, control circuitry 79 may inject the generated test bit sequence onto the corresponding transmit path. For example, circuitry 79 on RF module 40-1 may inject the generated test bit sequence onto transmit path 90 via circuitry 71. RF-module 40-1 may transmit the test bit sequence over EHF link 60 to second device 12.

At step 154, RF module 54-1 on second device 12 may receive the transmitted test bit sequence over EHF link 60. For example, module 54-1 may extract the test bit sequence from other data that is received over link 60. Module 54-1 may pass the received test bit sequence to baseband processor 48 for processing.

At step 156, baseband processor 48 and/or storage and processing circuitry 20 may process the received test bit sequence to identify the quality of EHF link 60. For example, circuitry 20 may compare the test bit sequence received from RF module 54-1 to a predetermined sequence to identify a bit error rate or other performance metric information associated with EHF link 60. Bit error rate values identified by circuitry 20 may, for example, be a measure of the number of incorrectly received bits in the received test bit sequence (e.g., higher bit error rate values may be indicative of a poorer link quality whereas lower bit error rate values may be indicative of a higher link quality). This example is merely illustrative and, in general, any desired wireless performance metrics may be used. A similar procedure may be performed at first device 10 for processing test bit sequences received from second device 12. By injecting test data bits using RF modules 40 and 54, modules 40 and 54 and the corresponding EHF links 60 and 62 may be characterized without expensive external testing equipment.

Antennas 30 for conveying EHF signals over links 60 and 62 may be formed within a housing 14 having metal housing portions. The metal housing portions may provide an attractive form factor to device 10 and/or may form a portion of one or more antennas within the device. In general, conductors such as metal portions of housing 14 may block radio-frequency signals. Openings may be formed in metal portions of housing 14 to allow for EHF wireless signals to be conveyed to and from antennas 30. If desired, the openings may be filled with dielectric material to form dielectric antenna windows in the metal housing. The dielectric antenna windows may allow EHF signals to be conveyed into or out of the metal housing while blocking dirt, moisture, or other debris from entering the interior of the housing.

Figure 6:
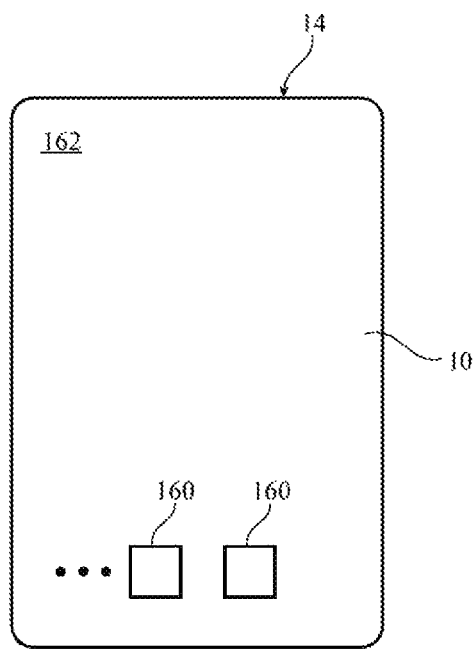
FIG. 6 is a diagram showing how an illustrative electronic device may include respective antenna windows for handling millimeter wave communications links using multiple antennas in accordance with an embodiment.

FIG. 6 shows a rear view of first device 10 having metal housing portions 14 and at least two dielectric antenna windows formed in metal housing portions 14. As shown in FIG. 6, rear surface 162 of first device 10 may be formed from metal housing portions 14 (e.g., a planar metal layer or sheet extending across the width and length of the device). Rear surface 162 may be formed on an opposite side of device 10 from display 70 (FIG. 2). At least two dielectric antenna windows 160 may be formed in openings in metal housing 14. Dielectric antenna windows 160 may be formed from any desired dielectric materials (e.g., polymer, plastic, glass, ceramic, sapphire, rubber, combinations of these materials, etc.).

Each antenna window 160 may be formed over a corresponding antenna 30. For example, a first antenna window 160 may be formed over a given antenna 30 that is used to convey signals associated with EHF link 60 whereas a second antenna window 160 may be formed over a given antenna 30 that is used to convey signals associated with EHF link 62. In other words, RF module 40-1 and RF module 40-N may transmit or receive signals through two different antenna windows 160 in housing 14. The use of two different antenna windows for each link may allow for the windows and thus the corresponding RF modules to be formed relatively far apart in device 10. Such spatial separation may allow for an increase in spatial isolation between links 60 and 62, and a corresponding reduction in interference between the links.

The example of FIG. 6 is merely illustrative. In general, windows 160 may have any desired shape (e.g., a circular shape, oval shape, rectangular shape, polygonal shape, a logo shape, etc.). Each of windows 160 may be the same size or may be different sizes. Each of windows 160 may be the same shape or may be different shapes. In the example of FIG. 6, windows 160 are formed adjacent to the bottom of device 10. In general, windows 160 may be formed at any desired location on surface 162. Similar windows 160 may be formed on second device 12 when device 12 includes metal housing portions, if desired.

Figure 7:
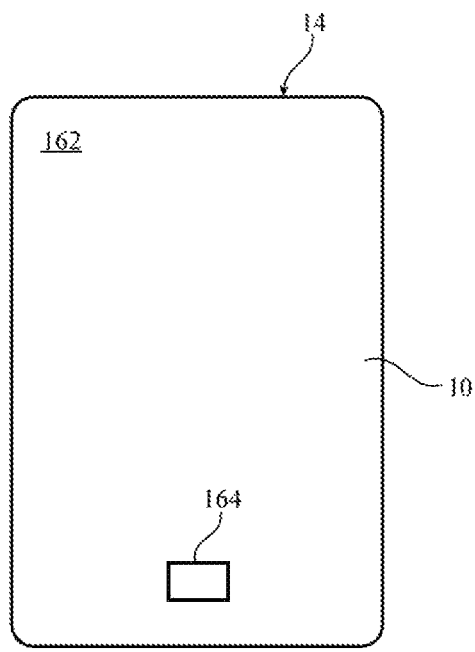
FIG. 7 is a diagram showing how an illustrative electronic device may include a single antenna window for handling multiple millimeter wave communications links using a single antenna in accordance with an embodiment.

If desired, RF modules 40-1 and 40-N may transmit and receive EHF signals through the same antenna window in metal housing 14. FIG. 7 shows a rear view of device 10 in an example where EHF links 60 and 62 are conveyed through a single antenna window. As shown in FIG. 7, a single antenna window 164 may be formed in rear surface 162 of metal housing 14. Antenna window 164 may be formed from any desired dielectric materials. Each antenna 30 that is used to convey EHF signals for RF module 40-1 and RF module 40-N may transmit and/or receive signals associated with EHF links 60 and 62 through window 164. For example, a first antenna 30 that transmits signals from RF module 40-1 may transmit the signals through window 164 and a second antenna 30 that receives signals associated from RF module 54-N may receive the signals through antenna window 164.

The example of FIG. 7 is merely illustrative. In general, window 164 may have any desired shape (e.g., a circular shape, oval shape, rectangular shape, polygonal shape, a logo shape, etc.). Window 164 may have any desired size (e.g., window 160 may extend across the entire width of device 10 or a fraction of the width of rear surface 162). Window 164 may be formed adjacent to the bottom side of device 10 or at any other desired location on rear surface 162 (e.g., in the center of surface 162, adjacent to the top side of device 10, etc.). A similar window 164 may be formed on second device 12 when device 12 includes metal housing portions, if desired.

In practice, conveying EHF signals for both modules 40-1 and 40-N over separate antennas 30 and through the same antenna window 164 may introduce excessive interference between EHF links 60 and 62 (e.g., due to the relatively short spatial separation between the RF modules when a single antenna window is used). If desired, modules 40-1 and 40-N may transmit and receive signals for EHF links 60 and 62 over the same antenna 30. In this scenario, only a single antenna 30 for communicating over links 60 and 62 is formed behind window 164.

In order to compensate for the lack of spatial separation between the RF modules in this scenario, devices 10 and 12 may, if desired, perform time division duplexing operations for concurrently maintaining EHF links 60 and 62. In a time division duplexing scheme, EHF signals for link 60 may be interspersed in time with EHF signals for link 62 using switching circuitry on first device 10 and second device 12. For example, signals for EHF link 60 may be conveyed during a first set of time periods and signals for EHF link 62 may be conveyed during a second set of time periods that is interspersed with the first set of time periods. Performing time division duplexing may help to mitigate interference between EHF links 60 and 62 (e.g., because only one of EHF links 60 and 62 is being used for data transmission at a given time). However, performing time division duplexing may undesirably limit the data rate of the EHF link to 500 MBps or less.

If desired, devices 10 and 12 may perform frequency division duplexing operations for maintaining EHF links 60 and 62 when a single antenna 30 is used. In a frequency division duplexing scheme, EHF signals for link 60 are transmitted by first device 10 in a first frequency band and EHF signals for link 62 are transmitted by second device 12 in a second frequency band that is different from the first frequency band. Filtering circuitry in radio-frequency circuitry 34 on first device 10 and in radio-frequency circuitry 50 on second device 12 may allow for simultaneous transmission and reception of signals for EHF links 60 and 62 over a single antenna and through a single antenna window 164.

Figure 8:
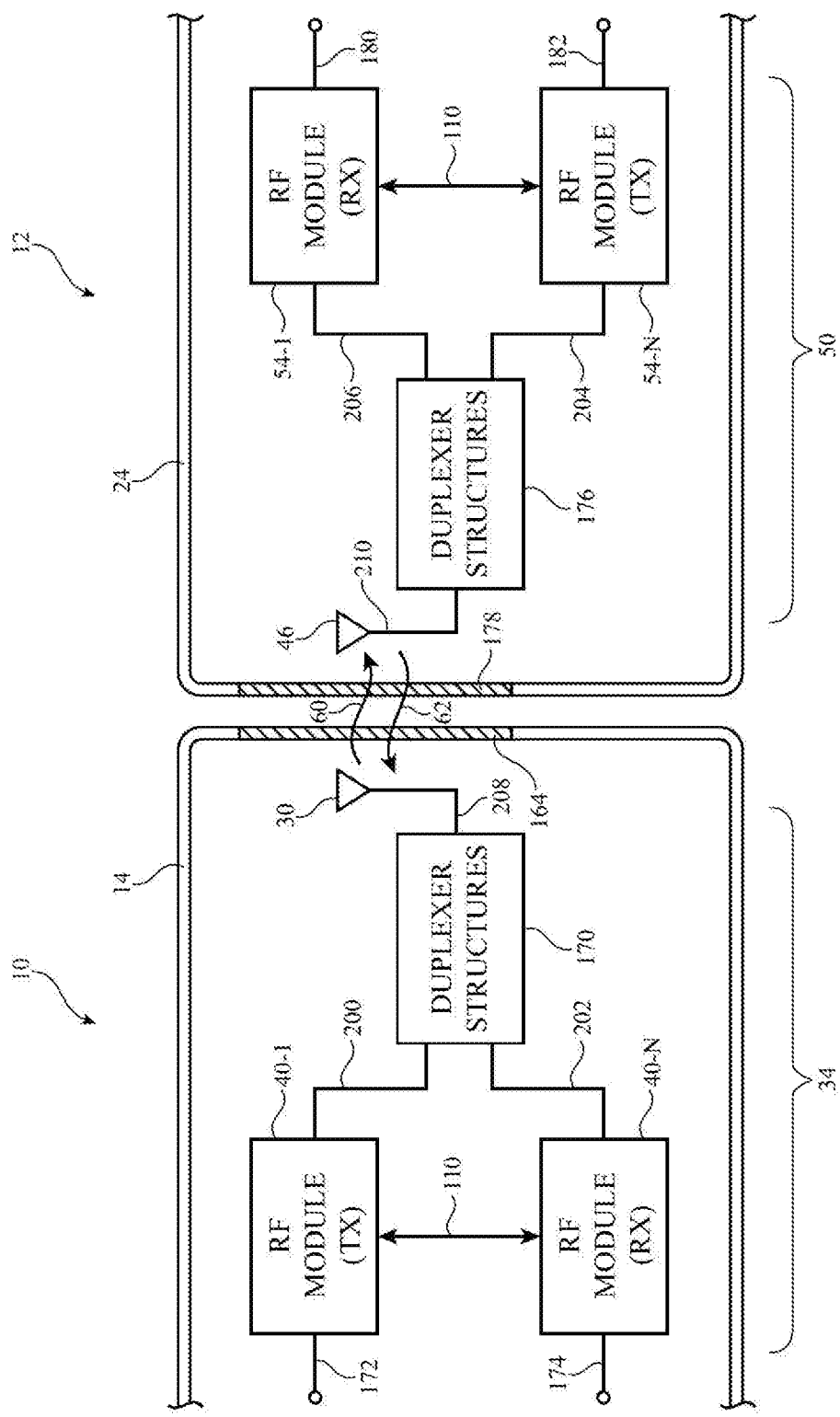
FIG. 8 is a diagram showing how an illustrative electronic device may include filtering circuitry for concurrently conveying millimeter wave signals in different millimeter wave bands over a single antenna and through a single antenna window in accordance with an embodiment.

FIG. 8 is an illustrative diagram showing how devices 10 and 12 may perform frequency division duplexing operations. The frequency division duplexing operations may allow for simultaneous reception and transmission of EHF signals over a single antenna and through a single corresponding antenna window in each device.

As shown in FIG. 8, first device 10 may include metal housing 14 having dielectric antenna window 164. A single antenna 30 for handling EHF communications may be formed within housing 14 adjacent to dielectric antenna window 164. Second device 12 may include metal housing 24 having dielectric antenna window 178. A single antenna 46 for handling EHF communications may be formed within metal housing 24 and adjacent to dielectric antenna window 178.

RF module 40-1 on first device 10 may receive signals in a first EHF band over path 172. RF module 40-1 may transmit the signals in the first EHF band over transmission line path 200, duplexer structures 170, transmission line path 208, and a single antenna 30. In this way, RF module 40-1 may serve as a millimeter wave transmitter (TX) for first device 10. The signals transmitted by module 40-1 may be conveyed from antenna 30 to antenna 46 on second device 12 over EHF link 60.

RF module 54-1 on second device 12 may receive the transmitted signals associated with EHF link 60 (e.g., the signals in the first EHF band) via a single antenna 46, transmission line structures 210, duplexer structures 176, and transmission line structures 206. RF module 54-1 may convey the received signals over path 180. In this way, RF module 54-1 may serve as a millimeter wave receiver (RX) for second device 12.

RF module 54-N on second device 12 may receive signals in a second EHF band over path 182. RF module 54-N may transmit the signals in the second EHF band over transmission line path 204, duplexer structures 176, transmission line path 210, and antenna 46. In this way, RF module 54-N may serve as a millimeter wave transmitter (TX) for second device 12. The signals transmitted by module 54-N may be conveyed from antenna 46 to antenna 30 on first device 10 over EHF link 62.

RF module 40-N on first device 10 may receive the transmitted signals associated with EHF link 62 (e.g., the signals in the second EHF band) via antenna 30, transmission line structures 208, duplexer structures 170, and transmission line structures 202. RF module 40-N may convey the received signals over path 174. In this way, RF module 40-N may serve as a millimeter wave receiver (RX) for first device 10. The first frequency band handled by modules 40-1 and 54-1 may be, for example, a 60 GHz frequency band, a 62.5 GHz frequency band, a 58.5 GHz frequency band, a frequency band at a frequency between 60 and 62.5 GHz, a frequency band at a frequency between 10 and 58.5 GHz, a frequency band at a frequency between 58.5 and 60 GHz, or a frequency band at a frequency greater than 62.5 GHz. The second frequency band handled by modules 40-N and 54-N may be, for example, a 60 GHz frequency band, a 62.5 GHz frequency band, a 58.5 GHz frequency band, a frequency band at a frequency between 60 and 62.5 GHz, a frequency band at a frequency between 10 and 58.5 GHz, a frequency band at a frequency between 58.5 and 60 GHz, or a frequency band at a frequency greater than 62.5 GHz (e.g., as long as the first and second frequency bands are different so as to allow for frequency division duplexing). In one particular example, RF module 40-1 and RF module 54-1 handle EHF signals in a 62.5 GHz frequency band whereas RF module 40-N and RF module 54-N handle EHF signals in a 58.5 GHz frequency band. In another example, RF modules 40-1 and 54-1 handle EHF signals in a 58.5 GHz frequency band whereas RF modules 40-N and 54-N handle EHG signals in a 62.5 GHz frequency band.

Radio-frequency circuitry 34 on first device 10 may include filtering circuitry such as duplexer circuitry 170. Capacitor-based and inductor-based filtering components have little to no effect on signals on millimeter waves having a frequency of 10 GHz or higher. Duplexer 170 may thereby perform millimeter wave signal filtering operations without using capacitor or inductor components. Duplexer 170 may include EHF duplexer structures that are capable of handling and filtering signals at frequencies of greater than 10 GHz. For example, duplexer 170 may include resonant cavities and waveguide structures that are coupled together to form the desired filtering structures. The resonant cavity and waveguide structures may have sizes and shapes that are configured to handle and filter signals at frequencies greater than 10 GHz.

Duplexer 170 may have a first port coupled to RF module 40-1 via transmission line path 200, a second port coupled to RF module 40-N via transmission line path 202, and third port coupled to antenna 30 via transmission line path 208. If desired, amplifier circuits may be interposed on transmission line structures 200 and/or 202. The cavity and waveguide filter structures in duplexer 170 may provide high isolation between paths 200 and 202. For example, the cavities and waveguides in duplexer 170 may have a desired shape and arrangement so as to isolate 58.5 GHz signals from 62.5 GHz signals (e.g., in scenarios where links 60 and 62 are 62.5 GHz and 58.5 GHz links, respectively). Duplexer 170 may help prevent the relatively high magnitude EHF signals transmitted by RF module 40-1 from being received by RF module 40-N, thereby providing high EHF isolation between the RF modules. In this way, duplexer 170 may allow for EHF signals in the first and second EHF frequency bands to be simultaneously transmitted and received over a single antenna 30 without generating interference from the signals transmitted by RF module 40-1 onto RF module 40-N.

Radio-frequency circuitry 50 on second device 12 may include filtering circuitry such as duplexer circuitry 176. Duplexer 176 may be millimeter wave duplexer circuitry that is capable of handling signals at frequencies of greater than 10 GHz. Duplexer 176 may include resonant cavities and waveguide structures that are coupled together to form the desired filtering structures. The resonant cavity and waveguide structures may sizes and shapes that are configured to handle and filter signals at frequencies greater than 10 GHz.

Duplexer 176 may have a first port coupled to RF module 54-N via transmission line path 204, a second port coupled to RF module 54-1 via transmission line path 206, and third port coupled to antenna 46 via transmission line path 210. If desired, amplifier circuits may be interposed on transmission line paths 206 and/or 204. The cavity and waveguide filter structures in duplexer 176 may provide high isolation between paths 206 and 204. For example, the cavities and waveguides in duplexer 170 may have a desired shape and arrangement so as to isolate 58.5 GHz signals from 62.5 GHz signals (e.g., in scenarios where links 60 and 62 are 62.5 GHz and 58.5 GHz links, respectively). Duplexer 176 may help prevent the relatively high magnitude EHF signals transmitted by RF module 54-N from being received by RF module 54-1, thereby providing high EHF isolation between the RF modules. In this way, duplexer 176 may allow for EHF signals to be simultaneously transmitted and received over antenna 46 without generating interference from the signals transmitted by RF module 54-N onto RF module 54-1. As shown in FIG. 8, high data rate EHF data links 60 and 62 are both conveyed through a single antenna window 164 in metal housing 14. Use of a single antenna window for conveying both links 60 and 62 may allow for an improved aesthetics and reduced manufacturing complexity relative to scenarios where two antenna windows 160 are formed. A single antenna window may also reduce the rotational sensitivity of device 10 relative to scenarios where two or more antenna windows are used.

The example of FIG. 8 is merely illustrative. If desired, duplexers 170 and 178 may be replaced with diplexer circuitry or any other desired circuitry for isolating multiple signals at frequencies of greater than 10 GHz. In the example of FIG. 8, a single antenna is used to convey EHF signals for each device. If desired, two or more antennas may be used in each device for conveying EHF signals.

Figure 9:
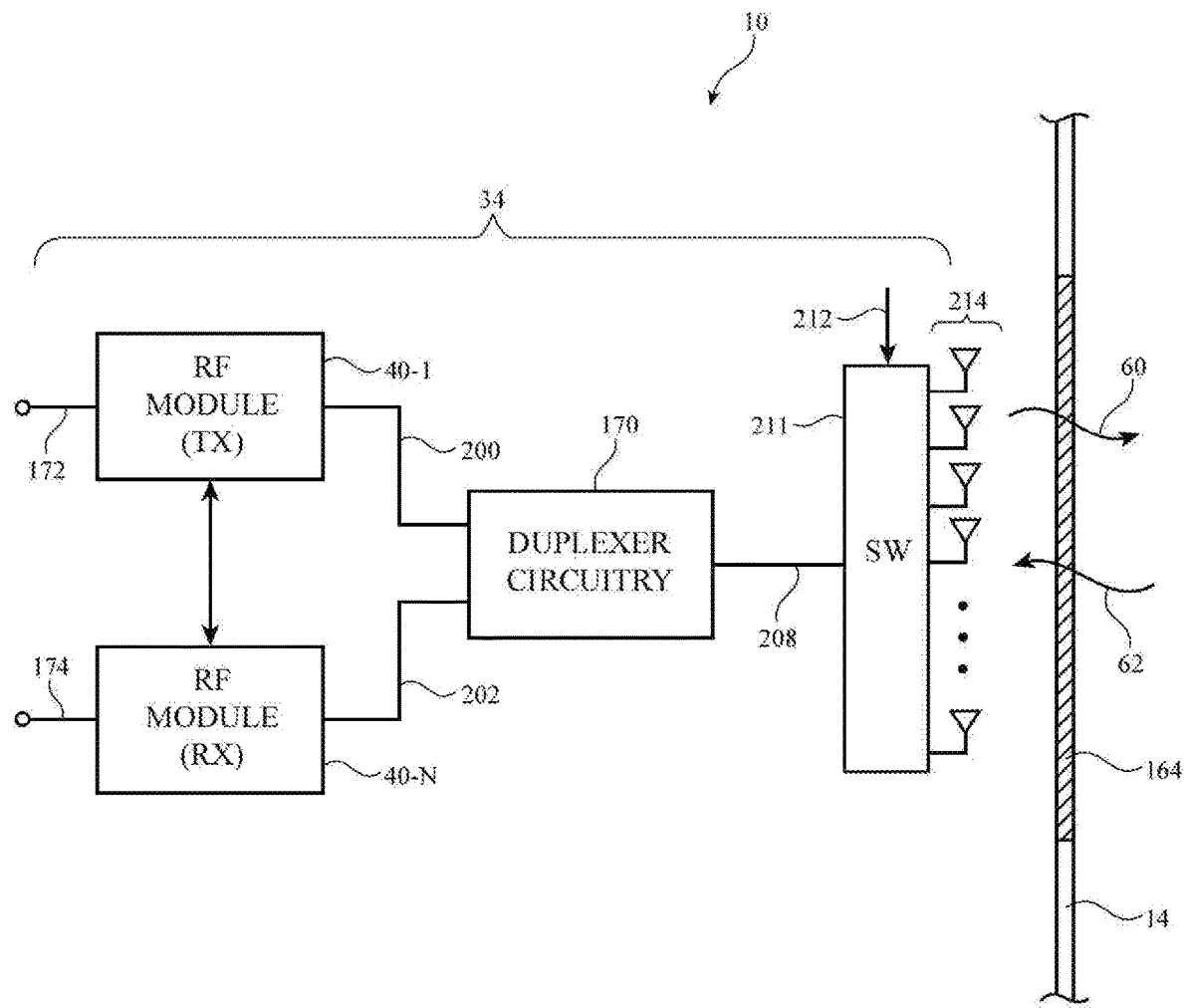
FIG. 9 is a diagram showing how an illustrative electronic device of the type shown in FIG. 8 may include multiple antennas for transmitting millimeter wave signals through a single antenna window in accordance with an embodiment.

FIG. 9 is an illustrative diagram showing how device 10 may include multiple antennas for conveying EHF signals. As shown in FIG. 9, duplexer circuitry 170 may be coupled to multiple antennas 214 through switching circuitry 211. Antennas 214 may include two or more antennas such as antenna 30 of the type described above in connection with FIGS. 1-8. Antennas 214 may include, for example, two antennas, three antennas, four antennas, or more than four antennas. In one suitable arrangement, antennas 214 may be a phased antenna array. Each of antennas 214 may transmit and/or receive EHF signals through a single antenna window 164 in metal housing 14 if desired.

Each of the antennas 214 may be used together or one or more of the antennas may be switched into use while other antenna(s) are switched out of use. If desired, control circuitry such as storage and processing circuitry 16 (FIG. 2) may be used to select an optimum antenna to use for EHF communications in real time and/or to select an optimum setting for adjustable wireless circuitry associated with one or more antennas 214. Antenna adjustments may be made to tune antennas to perform in desired frequency ranges, to perform beam steering (e.g., in scenarios where antennas 214 include a phased antenna array), and to otherwise optimize antenna performance. For example, control circuitry 16 may control switch 211 by providing control signals 212 to switch 211. Control circuitry 16 may use control signals 212 to switch one or more antennas 214 into use (e.g., by coupling the antennas to duplexer 170 over transmission line 208) while switching other antennas 214 out of use (e.g., by de-coupling the antennas from transmission line 208).

In some configurations, antennas 214 may include antenna arrays (e.g., phased antenna arrays to implement beam steering functions). For example, the antennas that are used in handling millimeter wave signals for extremely high frequency wireless transceiver modules 40 may be implemented as phased antenna arrays. The radiating elements in a phased antenna array for supporting millimeter wave communications may be patch antennas, dipole antennas, or other suitable antenna elements. Antennas 214 may be integrated with RF modules 40 to form integrated phased antenna array and transceiver circuit modules if desired. If desired, control circuitry 16 may adjust switch 211 to perform beam steering over an array of antennas 214. In this scenario, radio-frequency circuitry 34 may include phase adjustment circuitry (not shown) for adjusting the relative phases of signals provided to each of the antennas 214 (e.g., so that the transmitted signals have peaks and troughs such that the transmitted signals are effectively steered in a desired direction). While the example of FIG. 9 is described in connection with first device 10 of communications system 8, second device 12 may include similar structures for allowing multiple antennas to convey EHF signals through a single antenna window 178.

If desired, RF modules 40-1, 40-N, 54-1, and 54-N as shown in FIGS. 8 and 9 may perform active feedback transmit power level adjustments as described above in connection with FIG. 3. For example, RF module 110 may actively determine that established EHF link 62 has an unacceptable link quality. RF module 40-N may convey control signals to RF module 40-1 over control path 110 identifying changes to be made to the transmit power level of link 62. In another suitable arrangement processing circuitry 16 (FIG. 1) may convey control signals to RF module 40-1 identifying changes to be made to the transmit power level of link 62. RF module 40-1 may transmit the control signals over transmission path 200, duplexer 170, transmission path 208, and antenna 30 so that the control signals are conveyed through antenna window 164 and to antenna 46 on second device 12 (e.g., over EHF link 60).

The control signals may be routed over transmission line 210, duplexer 176, and transmission line 206 to RF module 54-1. Control circuitry 79 in RF module 54-1 may identify the received control signals and may route the control signals to RF module 54-N over path 110. RF module 54-N may perform transmit power level adjustments based on the received control signals. The transmit power level adjustments may affect the link quality of EHF link 62. First device 10 may continue to evaluate the quality of link 62. If first device 10 determines that the adjusted transmit power has resulted in sufficient link quality for EHF link 62, data may continue to be transmitted normally. If first device 10 determines that the adjusted transmit power level has still resulted in insufficient link quality for EHF link 62, first device 10 may provide additional control signals to second device 12 to instruct second device 12 to perform additional transmit power level adjustments. A similar procedure may be performed by devices 10 and 12 to adjust transmit power levels for EHF link 60. If desired, first device 10 and/or second device 12 may generate and transmit a pseudo random bit sequence through windows 164 and 178 in evaluating the quality of EHF links 60 and 62, as described above in connection with FIG. 5 (e.g., to determine whether transmit power level adjustments need to be made or in performing any other desired characterization of links 60 and 62).

Radio-frequency circuitry 34 in first device 10 may operate on the physical layer of the Open System Interconnections (OSI) model. In general, the OSI model includes seven network protocol layers. The layers of the OSI model are stacked to form a hierarchy with the physical layer (PHY) at the first and lowest layer (Layer-1) and the application layer at the seventh and highest level of the hierarchy. Radio-frequency circuitry 34 may sometimes be referred to herein as RF PHY circuitry 34 or Layer-1 circuitry 34. RF PHY circuitry 34 may perform Layer-1 processing operations such as beam steering operations on data received from baseband processor 32 and data received over antennas 214. If desired, baseband processor 32 may convey data to RF PHY circuitry 34 without performing any OSI encoding operations on the data. This may allow baseband processor 32 to have a reduced size relative to RF PHY circuitry 34 and relative to scenarios where baseband processor 32 performs OSI encoding operations.

Figure 10:
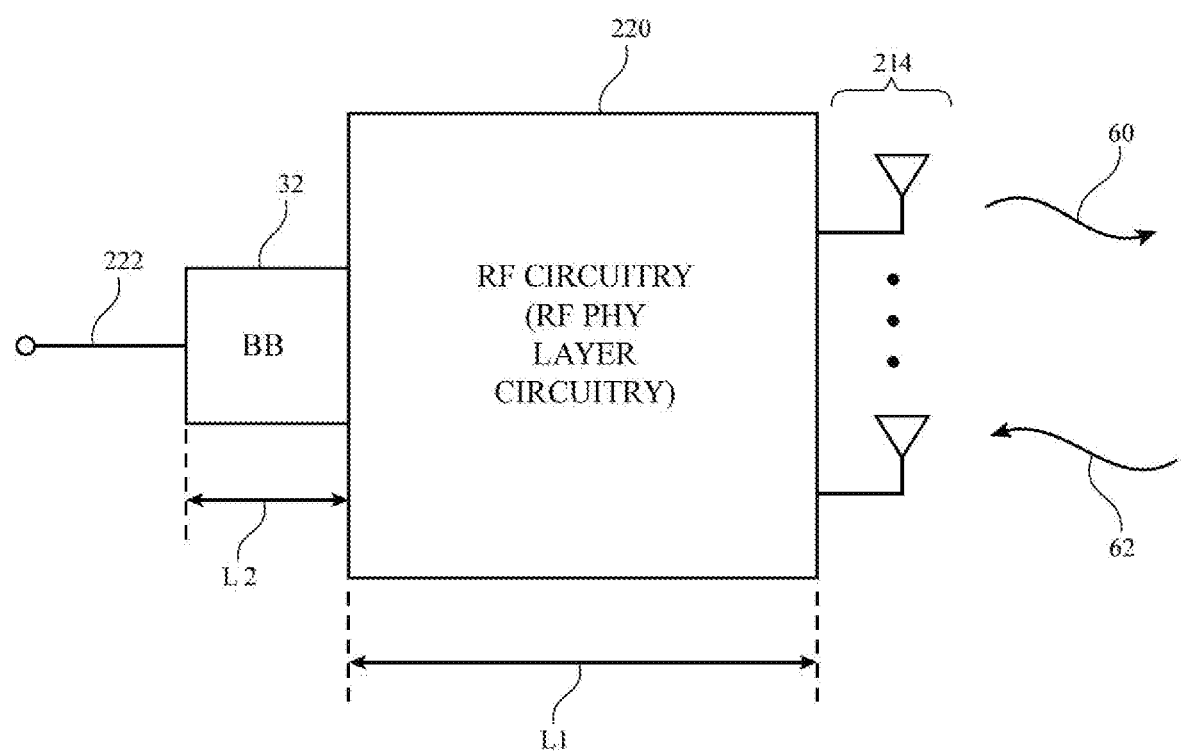
FIG. 10 is a block diagram showing how a simplified baseband processor may provide data to radio-frequency circuitry that performs beam steering operations in accordance with an embodiment.

FIG. 10 is an illustrative diagram showing how simplified baseband processing circuitry may convey signals to RF PHY circuitry in device 10. As shown in FIG. 10, baseband processor circuitry 32 may receive data for transmission over path 222. Baseband processor circuitry 32 may be formed as a part of RF module 40 (e.g., as shown by circuitry 75 in the example of FIG. 3) or may be formed separately from the module. As an example, storage and processing circuitry 16 may provide data for transmission to baseband processor 32 over path 222. Baseband processor 32 may convey the received stream of data to RF PHY circuitry 220. RF PHY circuitry 220 may operate on the physical layer (Layer-1) of the OSI model. RF PHY circuitry 220 may be formed on a single integrated circuit sometimes referred to herein as a physical layer chip or a PHY chip. RF PHY chip 220 may include radio-frequency circuitry 34 of the type shown in FIGS. 1, 8, and 9, for example.

Baseband processor 32 may be a simplified baseband processor that does not perform any encoding operations on the data received over path 222. For example, baseband 32 may deliver a stream of data received over path 222 to RF PHY circuitry 220 without packetizing the data (e.g., without arranging the data into a stream of packets according to a packet-based communications protocol) or adding frame headers to the data. If desired, baseband circuitry 32 may perform amplitude-shift keying (ASK) modulation on the data received over path 222. Performing ASK modulation on the data may represent the data as a variation in the amplitude of a carrier wave. The ASK modulated data may be transmitted to RF PHY 220. Similarly, baseband circuitry 32 may perform ASK demodulation on data received from RF PHY circuitry 220. If desired, baseband 32 may provide the received data to RF PHY circuitry 220 in the form of in-phase and quadrature-phase (I/Q) data.

RF PHY circuitry 220 may perform OSI physical layer operations on the data received from baseband 32. If desired, RF PHY circuitry 220 may perform IEEE 802.11ad communications operations using EHF signals. For example, PHY circuitry 220 may perform IEEE 802.11ad encoding and beam steering operations associated with IEEE 802.11ad communications on the data received from baseband 32 to transmit the data over an array of antennas 214. Because baseband 32 need not generate any packets or frame headers for the data, baseband 32 may have a reduced size relative to baseband processors that perform data packetization and relative to the size of RF PHY circuitry 220. For example, baseband 32 may have a lateral dimension L2 whereas RF PHY circuitry 220 has a lateral dimension L1 that is greater than lateral dimension L1. As an example baseband processor 32 may have a size of 5 mm by 5 mm or smaller, whereas RF PHY circuitry 220 has a size of 10 mm by 10 mm or greater. The reduced size of baseband circuitry 32 may contribute to an overall reduction in the size of the wireless circuitry in device 10 relative to scenarios where more complex baseband circuitry is used, while still allowing complex operations such as IEEE 802.11ad beam steering to be performed. While described in connection with first device 10, the components of FIG. 10 may be used to form the wireless circuitry of second device 12 if desired.

In the examples of FIGS. 7-9, a single antenna window 164 is formed in device 10 for conveying both EHF communications links 60 and 62. Conveying multiple EHF communications links through a single antenna window may remove rotational sensitivity of device 10 when communicating with other EHF devices.

Figure 11:
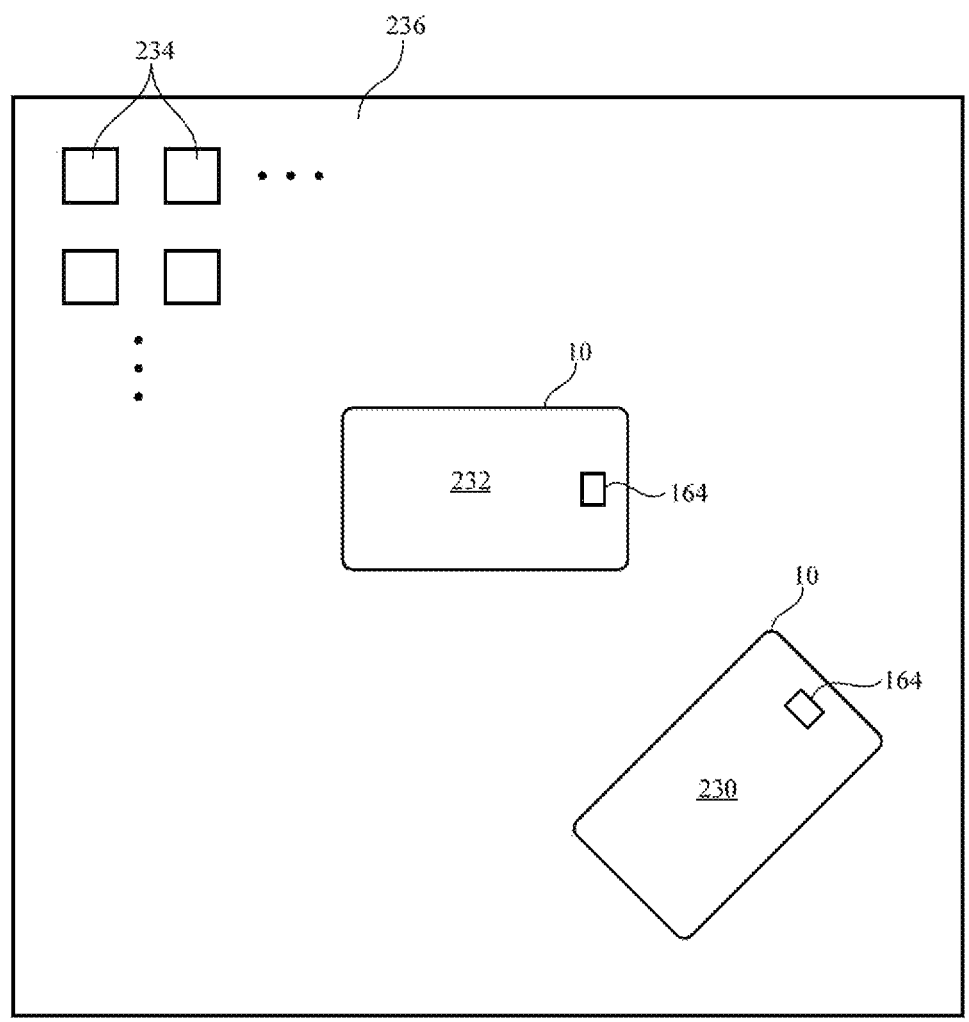
FIG. 11 is a diagram showing how an illustrative electronic device having a single antenna window for conveying millimeter wave signals may be insensitive to device orientation with respect to an external device in accordance with an embodiment.

FIG. 11 is an illustrative diagram showing how a single antenna window 164 on first device 10 may allow device 10 to be rotationally insensitive when communicating in EHF bands with an external device. As shown in FIG. 11, first device 10 may be communicably coupled via EHF links 60 and 62 with an external device 236. External device 236 may be a secondary device such as device 12 as shown in FIGS. 1, 8, and 9. In the example of FIG. 11, device 236 is a peripheral mat or docking device. Primary device 10 may be placed on top of mat device 236 (e.g., by a user of device 10). Mat device 236 may perform wireless data synching operations with device 10 over EHF links 60 and 62 while device 10 is placed on top of mat device 236, for example. The high data rate of links 60 and 62 may allow data synching operations to be performed much more rapidly than when lower frequency links are used. If desired, mat 236 may perform wireless charging operations on device 10 (e.g., to wirelessly charge a battery on device 10) or any other desired wireless operations to support device 10 when placed on top of mat 236.

As shown in FIG. 11, peripheral device 236 may include a number of antennas 234 for conveying EHF signals. Antennas 234 may be arranged in a repeating array of antennas on the top surface of device 236. Antennas 234 may be formed behind respective dielectric antenna windows or may be formed behind a dielectric cover for device 236.

In scenarios where first device 10 has two separate antenna windows for conveying respective EHF links 60 and 62 (e.g., windows 160 as shown in FIG. 6), the windows need to overlap with two corresponding antennas 234 on device 236 for the links to be properly established and for high data rate data transfer between the two devices to occur. If care is not taken when placing first device 10 onto peripheral device 236, one of the two antenna windows may be misaligned with respect to two corresponding antennas 234 on device 236. Such misalignment could prevent EHF links 60 and 62 from being established between devices 10 and 12.

The example of FIG. 11 shows a scenario where device 10 has a single antenna window 164 for conveying both EHF links 60 and 62 (e.g., using a frequency duplexing scheme such as that shown in FIGS. 8 and 9). First device 10 may be placed at a number of different positions and orientations on device 236 such as positions 232 and 230. Because first device 10 includes only a single antenna window 164 for conveying both EHF links 60 and 62, device 10 may be more easily aligned with a corresponding antenna 234 on device 236 (regardless of the orientation of device 10) than when two separate antenna windows 160 are used. This may allow EHF links 60 and 62 to be established and maintained with peripheral device 236 regardless of the orientation and position of first device 10 on top of peripheral device 236. In other words, forming a single antenna window 164 for conveying both EHF links 60 and 62 may allow for first device 10 to be rotationally insensitive or invariant for performing high speed data transfer operations with secondary device 236 over wireless links at frequencies greater than 10 GHz. This may, for example, allow a user of first device 10 to place device 10 onto device 236 without expending time and energy to ensure that multiple antenna windows on device 10 are aligned with two corresponding antennas on device 236.

The high data rates obtainable by devices 10 and 12 for performing data transfer operations (e.g., 500 Mbps or higher, 1 bit per second or higher, 500 Mega bytes per second (MBps) or higher, etc.) may allow relatively large data files to be wireless transferred between the devices in a short or even unnoticeable amount of time relative to scenarios where lower frequencies are used. The supported high data rates may, for example, allow for first device 10 to off-load complex processing operations to secondary device 12. For example, second device 12 may include processing circuitry having greater processing power than first device 10. If desired, first device 10 may off-load complex processing operations to second device 12 via EHF links 60 and 62. Second device 12 may have sufficient processing power and EHF links 60 and 62 may have sufficient bandwidth (data rates) such that second device 12 can receive data from first device 10 for processing, perform the off-loaded processing operations on the received data, and return the processed data over links 60 and 62 in less time than if first device 10 had performed the processing operations itself. By performing data transfer operations over a wireless link, bulky wired data ports can be omitted from the system. Use of a single antenna window 164 may allow for rotational invariance between devices 10 and 12 when communicating over EHF links 60 and 62, improved device aesthetics, and reduced manufacturing complexity. Use of active transmit power feedback between devices 10 and 12 may allow for links 60 and 62 to be maintained at an optimal link quality even if the operating conditions for devices 10 and 12 change over time.

The foregoing is merely illustrative and various modifications can be made by those skilled in the art without departing from the scope and spirit of the described embodiments. The foregoing embodiments may be implemented individually or in any combination.

What is claimed is:

1. An electronic device that wirelessly communicates with an external electronic device, the electronic device comprising:
   a conductive housing;
   a dielectric antenna window in the conductive housing;
   a first radio-frequency transceiver that generates first Extremely High Frequency (EHF) signals in a first EHF band;
   an antenna that transmits the first EHF signals to the external electronic device through the dielectric antenna window and that receives second EHF signals from the external electronic device through the dielectric antenna window, wherein the second EHF signals are in a second EHF band that is different from the first EHF band;
   a second radio-frequency transceiver that receives the second EHF signals from the antenna; and
   a duplexer having a first port coupled to the first radio-frequency transceiver, a second port coupled to the second radio-frequency transceiver, and a third port coupled to the antenna, wherein the duplexer is configured to isolate the first EHF signals from the second EHF signals, the antenna is configured to transmit the first EHF signals at a transmit power level, the antenna is configured to receive control signals from the external electronic device in the second EHF band, the second radio-frequency transceiver is configured to convey, via an inter-chip control path, the control signals received by the antenna to the first radio-frequency transceiver, and the first radio-frequency transceiver is configured to adjust the transmit power level based on the control signals.

2. The electronic device defined in claim 1, wherein the first radio-frequency transceiver is formed on a first radio-frequency module and the second radio-frequency transceiver is formed on a second radio-frequency module that is different from the first radio-frequency module.

3. The electronic device defined in claim 1, wherein the duplexer comprises a resonant waveguide structure.

4. The electronic device defined in claim 1, wherein the first and second EHF bands each comprise frequencies above 10 GHz.

5. The electronic device defined in claim 4, wherein the first EHF band comprises a 62.5 GHz frequency band and the second EHF band comprises a 58.5 GHz frequency band.

6. The electronic device defined in claim 1, the electronic device further comprising:
  processing circuitry configured to identify a link quality associated with the received second EHF signals and configured to generate the control signals based on the identified link quality, wherein the antenna is configured to transmit the control signals to the external electronic device through the dielectric antenna window in the first EHF band, and the transmitted control signals instruct the external electronic device to adjust the transmit power level of the second EHF signals.

7. The electronic device defined in claim 1, further comprising:
  an additional antenna, wherein the additional antenna is configured to transmit the first EHF signals to the external electronic device through the dielectric antenna window and is configured to receive the second EHF signals from the external electronic device through the dielectric antenna window.

8. The electronic device defined in claim 1, further comprising:
  a phased antenna array that includes the antenna; and
  control circuitry, wherein the control circuitry is configured to control the phased antenna array to perform beam steering operations on the first EHF signals through the dielectric antenna window.

9. The electronic device defined in claim 1, further comprising:
  baseband processor circuitry coupled to an input of the first radio-frequency transceiver, wherein the baseband processor circuitry is configured to pass baseband signals corresponding to the first EHF signals to the first radio-frequency transceiver without performing any packetization of the baseband signals.

10. The electronic device defined in claim 1, further comprising:
  a display having a display cover layer, wherein the conductive housing comprises a planar rear surface for the electronic device that opposes the display cover layer, the conductive housing comprises sidewall structures extending from the planar rear surface to the display cover layer, and the dielectric antenna window is formed in an opening in the planar rear surface of the conductive housing.

11. The electronic device defined in claim 1, wherein the antenna is configured to transmit the first EHF signals at a transmit power level, the electronic device further comprising:
  control circuitry configured to adjust the transmit power level based on the second EHF signals received from the external electronic device.

12. The electronic device defined in claim 11, wherein the control circuitry is configured to determine whether a link quality associated with the received second EHF signals is satisfactory and, in response to identifying that the link quality associated with the received second EHF signals is unsatisfactory, generate a wireless control signal that identifies a power level adjustment for the external electronic device and transmit the wireless control signal to the external electronic device over the antenna in the first EHF band.

13. The electronic device defined in claim 1, further comprising:
  a baseband processor coupled to the first and second radio-frequency transceivers.

14. The electronic device defined in claim 13, wherein the baseband processor is configured to perform amplitude-shift keying (ASK) modulation on a stream of data to generate ASK modulated data, the baseband processor being further configured to provide the ASK modulated data to first radio-frequency transceiver.

15. The electronic device defined in claim 14, wherein the baseband processor is configured to perform ASK demodulation on an additional stream of data received from the second radio-frequency transceiver.

16. The electronic device defined in claim 1, wherein the second radio-frequency transceiver is configured to convey the control signals to the first radio-frequency transceiver over the inter-chip control path using an Inter-Chip Communication (ICC) protocol.

17. The electronic device defined in claim 16, wherein the first radio-frequency transceiver is formed on a first integrated circuit chip, the second radio-frequency transceiver is formed on a second integrated circuit chip that is different from the integrated circuit chip, the first radio-frequency transceiver comprises debugging circuitry, that is-configured to generate a pseudo-random sequence of test bits and is configured to inject the pseudo-random sequence of test bits onto the antenna for transmission to the external electronic device through the dielectric antenna window, the electronic device further comprising a baseband processor coupled to the first and second radio-frequency transceivers, the baseband processor is configured to provide a stream of data to the first radio-frequency transceiver without packetizing the stream of data, the baseband processor is configured to perform amplitude-shift keying (ASK) modulation on a stream of data to generate ASK modulated data, the baseband processor is configured to provide the ASK modulated data to first radio-frequency transceiver, and the baseband processor is configured to perform ASK demodulation on an additional stream of data received from the second radio-frequency transceiver.

18. An electronic device that wirelessly communicates with an external electronic device, the electronic device comprising:
  a conductive housing;
  a dielectric antenna window in the conductive housing;
  a first radio-frequency transceiver that generates first Extremely High Frequency (EHF) signals in a first EHF band;
  an antenna that transmits the first EHF signals to the external electronic device through the dielectric antenna window and that receives second EHF signals from the external electronic device through the dielectric antenna window, wherein the second EHF signals are in a second EHF band that is different from the first EHF band;
a second radio-frequency transceiver that receives the second EHF signals from the antenna;
a duplexer having a first port coupled to the first radio-frequency transceiver, a second port coupled to the second radio-frequency transceiver, and a third port coupled to the antenna, wherein the duplexer is configured to isolate the first EHF signals from the second EHF signals, wherein the first radio-frequency transceiver comprises:
   debugging circuitry, the debugging circuitry being configured to generate a pseudo-random sequence of test bits and to inject the pseudo-random sequence of test bits onto the antenna for transmission to the external electronic device through the dielectric antenna window, wherein the antenna is configured to receive control signals in the second EHF band from the external electronic device, the external electronic device being configured to generate the control signals based on a link quality identified by the external electronic device based on the pseudo-random sequence of test bits; and
processing circuitry configured to adjust a transmit power level of the first EHF signals based on the control signals received from the external electronic device.

\* \* \* \* \*